United States Patent
Herrmann et al.

(10) Patent No.: US 9,742,525 B2
(45) Date of Patent: *Aug. 22, 2017

(54) TRANSMISSION METHOD, RECEPTION METHOD, TRANSMISSION APPARATUS, AND RECEPTION APPARATUS

(71) Applicant: Sun Patent Trust, New York, NY (US)

(72) Inventors: Frank Herrmann, Frankfurt (DE); Mihail Petrov, Bavaria (DE)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,431

(22) Filed: Jun. 29, 2016

(65) Prior Publication Data

US 2016/0323059 A1    Nov. 3, 2016

Related U.S. Application Data

(63) Continuation of application No. 13/580,203, filed as application No. PCT/JP2011/001080 on Feb. 24, 2011, now Pat. No. 9,414,099.

(30) Foreign Application Priority Data

Feb. 26, 2010 (EP) .................... 10154899

(51) Int. Cl.
*H04N 7/12* (2006.01)
*H04L 1/00* (2006.01)
(Continued)

(52) U.S. Cl.
CPC .......... *H04L 1/0025* (2013.01); *H04H 60/73* (2013.01); *H04L 69/323* (2013.01);
(Continued)

(58) Field of Classification Search
None
See application file for complete search history.

(56) References Cited

U.S. PATENT DOCUMENTS 7,046,746 B1    5/2006 Keaney et al.
2009/0094356 A1*  4/2009 Vare ............... H04N 21/2362
                                                  709/223
(Continued)

FOREIGN PATENT DOCUMENTS

WO      03/045054       5/2003

OTHER PUBLICATIONS

International Search Report issued Sep. 5, 2011 in corresponding International Application No. PCT/JP2011/001080.
(Continued)

*Primary Examiner* — Dakshesh Parikh
(74) *Attorney, Agent, or Firm* — Wenderoth, Lind & Ponack, L.L.P.

(57) ABSTRACT

The present invention relates to transmission and reception of digital broadcast in a digital broadcast network supporting a configuration of multiple physical layer pipes (PLPs). In particular, signalling parameters relating to a complete PLP are transmitted within layer 1 signalling related to the PLP. The baseband frames mapped on the pipe are configured according to this layer 1 signalling in the same way at the transmitter as they are demapped on the receiver side. The baseband frames are transmitted and received without including these parameters, in particular, at least one of parameters indicating (i) an input stream format, (ii) a single or a multiple input stream, (iii) constant or adaptive coding and modulation, (iv) presence of input stream synchronization, (v) presence of null packet deletion, or (vi) input stream identifier.

4 Claims, 19 Drawing Sheets

(51) Int. Cl.
*H04N 21/2362* (2011.01)
*H04N 21/2383* (2011.01)
*H04N 21/6332* (2011.01)
*H04H 60/73* (2008.01)
*H04L 29/08* (2006.01)
*H04N 21/43* (2011.01)

(52) U.S. Cl.
CPC ..... *H04N 21/2362* (2013.01); *H04N 21/2383* (2013.01); *H04N 21/4305* (2013.01); *H04N 21/6332* (2013.01); *H04L 1/0003* (2013.01); *H04L 1/0009* (2013.01)

(56) References Cited

U.S. PATENT DOCUMENTS

| | | | |
|---|---|---|---|
| 2009/0187949 A1 | 7/2009 | Vare et al. | |
| 2009/0307727 A1* | 12/2009 | Thesling | H04H 20/74 725/63 |
| 2010/0195668 A1* | 8/2010 | Robert | H04L 5/0007 370/475 |
| 2011/0116576 A1 | 5/2011 | Ganter | |
| 2011/0286535 A1 | 11/2011 | Ko et al. | |
| 2012/0269234 A1 | 10/2012 | Zhang et al. | |
| 2014/0119342 A1 | 5/2014 | Tomoe et al. | |

OTHER PUBLICATIONS

Extended European Search Report issued Jun. 25, 2010 in corresponding European Application No. 10154899.8.
Dirk Kutscher et al., "Service Maps for Heterogeneous Network Environments", Proceedings of the 7th International Conference on Mobile Data Management (MDM '06), Nara, Japan, May 10-12, 2006, Piscataway, NJ, May 10, 2006, pp. 1-10, XP010917884.
ETSI EN 302 755 v1.1.1, "Digital Video Broadcasting (DVB); Frame structure channel coding and modulation for a second generation digital terrestrial television broadcasting system (DVB-T2)", Sep. 2009, pp. 2-167.
ETSI EN 300 744 v1.6.1, "Digital Video Broadcasting (DVB); Framing structure, channel coding and modulation for digital terrestrial television", Jan. 2009, pp. 2-66.
ETSI online, retrieved Feb. 25, 2010, from the Internet URL:http://www.esti.org, p. 1.
Communication pursuant to Article 94(3) EPC issued Aug. 14, 2014 in corresponding European Application No. 11708108.3.
"Digital Video Broadcasting (DVB); Generic Stream Encapsulation (GSE) implementation guidelines", Technical Specification, European Telecommunications Standards Institute (ETSI), 650, Route Des Lucioles, F-06921 Sophia-Antipolis, France, No. V1.1.1, Jun. 1, 2009, XP014044490, pp. 1-34.

* cited by examiner

TRANSMISSION METHOD, RECEPTION METHOD, TRANSMISSION APPARATUS, AND RECEPTION APPARATUS

TECHNICAL FIELD

The present invention relates to signalling in a digital broadcast network. In particular, the present invention relates to layer 1 (L1) signalling and to signalling within the header of baseband frames.

BACKGROUND ART

Digital broadcast networks enable the unidirectional transmission of data such as audio, video, subtitling text, applications, etc. In broadcast networks, there is typically no return channel from the receiver to the transmitter and thus adaptive techniques cannot be appropriately employed. At present, there are several families of digital broadcast standards around the world. For instance, in Europe, Digital Video Broadcasting (DVB) standards have been adopted. In general, these standards define the physical layer and the data link layer of the broadcast distribution system. The definition of the physical and data link layer depends on the transport medium, which can be for instance a satellite, cable, or terrestrial channel. Correspondingly, the family of DVB standards includes DVB-S and DVB-S2 for satellite transmission, DVB-C and DVB-C2 for cable transmission, DVB-T and DVB-T2 for terrestrial transmission, and DVB-H for terrestrial transmission to handheld devices.

The recent terrestrial digital broadcast standard DVB-T2 is a successor version of the widely used DVB-T standard in the same way as DVB-S2 and DVB-C2 are the second generation replacements of the first generation counterparts DVB-S and DVB-C. The specifications of the two standards for terrestrial transmission, namely the DVB-T2 standard and the DVB-T standard, can be found in Non-Patent Literature 1 and Non-Patent Literature 2, respectively. Further details and remaining DVB specifications can be found in Non-Patent Literature 3. Other than the DVB-T standard, the DVB-T2 standard introduces, for instance, the concept of physical layer pipes (PLP), provides new forward error correction schemes, modulation constellations, larger Orthogonal Frequency Division Multiplexing (OFDM) symbol sizes and more pilot configurations.

The concept of physical layer pipes allows multiple parallel data streams to be multiplexed at the physical layer. The processing for the multiple data streams may be configured separately by means of selecting, for example, a forward error correction (FEC) coding rate, modulation constellation size, interleaving length and other physical layer parameters. The separate configurability of the physical layer pipes enables the provision of different robustness levels for each individual physical layer pipe. In digital broadcasting systems that use physical layer pipes, each service (program) can be transmitted in its own physical layer pipe. This enables reducing the amount of data that must be demodulated at the receiver when assuming that only one service is consumed at a time, since the receiver only needs to demodulate the data carried in the corresponding physical layer pipe. The physical layer pipe processing includes an input processing, a forward error correction (FEC) encoding, a constellation mapping, and an interleaving. Within the input processing, the user packets (stemming from Transport Streams, Generic Streams, IP streams etc.) are transformed into an appropriately formatted bitstream which is then encoded and mapped on the physical layer resources. The input processing transforms user packets into baseband frames. The term "user packets" used for this invention covers also the case of continuous streams where no packet boundaries existed or are indicated.

The basic data structure at the physical layer is known as a baseband frame. The input stream of digital broadcast data is encapsulated into baseband frames. By applying forward error correction (FEC) to those baseband frames, FEC frames are formed. Baseband frames have a length which depends on the applied coding rate of the FEC coding. Baseband frames together with the parity bytes build FEC frames of fixed length, for instance, of 16,200 or 64.800 bits.

FIG. 1A illustrates the format of a baseband frame 101 with length 102 of bits. The baseband frame 101 comprises a baseband frame header 110 of length 111 (80 bits in DVB-S2, DVB-T2 and DVB-C2), a data field 120 with a data field length 121, and a padding field 130 with length 131. The padding field 130 may include in-band signalling information or be replaced by in-band signalling information. The length 121 of the data field is signalled within the baseband frame header 110. Signalling of the data field length (DFL) indicator 270 (cf. FIG. 2) is necessary in order to distinguish between the data (payload) 120 transported in the baseband frame 101 and padding field 130, which may be carried within the same baseband frame 101. The length 102 of the baseband frame 101 corresponds to the number of bits $K_{bch}$ to which the BCH code is applied. The padding field 130 has a length of $K_{bch}$-DFL-80 bits, wherein the 80 bits correspond to the length 111 of the baseband frame header.

Baseband frames carry the user content data and the meta-data belonging to a particular physical layer pipe of the broadcasting system. The baseband frames encapsulate arbitrary user packets, such as packets carrying data coded with a compression standard such as Moving Picture Experts Group (MPEG)-2 or MPEG-4 part 10 (H.264) and encapsulated into an MPEG transport stream, or any other packets. Moreover, the baseband frames also carry meta-data related to the content carried in the same baseband frame. In other words, baseband frames are the outer content encapsulation entity to which the energy dispersal scrambling as well as physical layer error correction coding is applied. A sequence of the baseband frames builds the content of a physical layer pipe within the broadcasting system.

A forward error correction (FEC) frame 105 is illustrated in FIG. 1B. The forward error correction frame 105 has a length 106 of $N_{ldpc}$ bits, and includes a baseband frame 101 with length 102 of $K_{bch}$ bits, a field 140 with a length 141 for BCH code parity bits, and a field 150 with a length 151 for parity bits of the Low Density Parity Check (LDPC) code. In the above notation, the subscript ("ldpc" or "bch") denotes the error correction method applied, N denotes the length of data in bits after applying the method in subscript, and K denotes the length of data in bits to which the subscript method is to be applied. Accordingly, the length 141 of the LDPC parity bit field 140 corresponds to $N_{bch}$-$K_{bch}$ bits. The baseband frame 101 together with the BCH parity bits 140 have a length 161 of $K_{ldpc}$ bits to which the LDPC code is applied which corresponds to $N_{bch}$ bits of the BCH-encoded data. The length 151 of the LDPC parity bit field 150 thus corresponds to $N_{ldpc}$-$K_{ldpc}$ bits.

FIG. 2 illustrates a baseband frame header 201 of a normal mode and a baseband frame header 202 of a high efficiency mode defined in the DVB-T2 and -C2 specifications. DVB-S2 uses only one baseband frame format that is identical to the normal mode format in -T2 and -C2 apart from the mode indication that is EXORed with the CRC-8 field in the C2 and T2 cases.

The baseband frame header 201, 202 in normal mode and/or in high-efficiency mode includes the flowing fields.

TS/GS Indicator 210

A TS/GS indicator 210 is an input stream format indicator indicating the format of the input stream transported by the baseband frame. The name "TS/GS" of the indicator is derived from the differentiation between a transport stream (TS) or a generic stream (GS). The length of the TS/GS indicator 210 is two bits for distinguishing the following input stream formats: a generic fixed-length packetized stream (GFPS), a transport stream (TS), a generic continual stream (GCS), and a generic encapsulated stream (GSE: generic stream encapsulation).

SIS/MIS Indicator 220

A SIS/MIS indicator 220 of one-bit length is for indicating whether a single input stream (SIS) or multiple input streams (MIS) are carried within the broadcast signal.

CCM/ACM Indicator 225

A CCM/ACM indicator 225 of one-bit length is for indicating whether constant coding and modulation (CCM) or adaptive coding and modulation (ACM) is applied. If constant coding and modulation is applied, all physical layer pipes use the same coding and modulation scheme. On the other side, if variable coding and modulation is applied, then in each physical layer pipe the modulation and coding scheme may be configured and it then remains constant during transmission. It may be statically reconfigured. In short, the configuration of whether CCM or ACM is applied is not changed frequently.

ISSYI 230

An ISSYI 230 is an input stream synchronization indicator of a one-bit length for indicating whether input stream synchronisation is active, i.e. whether an ISSY (input stream synchronization) field shall be computed and inserted into the baseband frame header in the case of high efficiency mode (ISSY 231 and/or 232) or attached to each user packet (with known packet boundaries) in the case of normal mode.

NPD Indicator 240

An null packet deletion (NPD) indicator 240 is of one-bit length for indicating whether the null packet deletion is activated or not. If null packet deletion is activated, then the number of deleted null packets is computed and appended after the user packets in a field of 8 bits.

EXT Field 245

An extension (EXT) field 245 is media specific and in DVB-T2 it is normally set to zero and reserved for future use.

ISI 250

An input stream identifier (ISI) 250 has a length of one byte. This field of header is denoted as MATYPE-2. It carries ISI if the SIS/MIS indicator is set to one, i.e., to a multiple input stream (MIS). If the SIS/MIS indicator is set to zero, i.e. indicates a single input stream, then the MATTYPE-2 byte is reserved for future use.

UPL Indicator 260

A user packet length indicator (UPL) 260 has a length of 16 bits and indicates user packet length in bits. UPL is not present in the high-efficiency mode.

DFL Indicator 270

The DFL indicator 270 is a data field length indicator of 16-bits length for indicating the data field length 121 in bits of the baseband frame.

SYNC Indicator 280

A synchronization sequence (SYNC) indicator 280 is of 8 bits and not present in the high-efficiency mode. It is not used in generic continuous stream mode and copies a user packet synchronisation byte otherwise.

SYNCD Indicator 285

A SYNCD indicator 285 of 16 bits is for indicating a distance in bits from the beginning of the data field 120 to the first user packet in the data field.

CRC-8/MODE Indicator 290

A CRC-8/MODE indicator 290 of 8-bits length is for carrying error detection parity bits for the baseband frame header and for indicating the BBF mode, i.e. either high efficiency or normal mode.

The first byte of the baseband frame header 201, 202 including TS/GS (2 bits), SIS/MIS (1 bit), CCM/ACM (1 bit), ISSYI (1 bit), NPD (1 bit) and EXT (2 bits) fields is typically denoted as MATYPE-1 byte.

In the high-efficiency mode, the baseband frame header 202 differs from the baseband frame header 201 in the normal mode in that it does not carry the UPL indicator 260 and the synchronization byte SYNC indicator 280. Instead, the baseband frame header 202 can carry in the corresponding positions an ISSY field 231, 232 (input stream synchronization) of 24 bits. In the normal mode, the ISSY field is appended to user packets for packetized streams. In the high efficiency mode. ISSY is transmitted per baseband frame in the baseband frame header, since the user packets of a baseband frame travel together, and therefore experience the same delay/jitter. The high efficiency mode in the DVB-T2 standard can thus be seen as a first attempt towards a more efficient transport of user packets by moving particular parameters from the user packet headers to the baseband frame headers.

With the concept of physical layer pipes, some parameters included in the baseband frames are already indicated by the layer 1 signalling or could be derived from the layer 1 signalling. Indicating the same information on different levels of mapping reduces the efficiency of transmission resources utilisation. Moreover, inconsistencies may arise such as opposite settings for the same parameter having an equivalent, for instance, on both layer 1 signalling and signalling within the baseband frame headers.

CITATION LIST

Non Patent Literature

NPL 1: ETSI standard EN 302 755, "Frame Structure Channel Coding and Modulation for a Second Generation Digital Terrestrial Television Broadcasting System (DVB-T2)"

NPL 2: ETSI standard ETS 300 744, "Digital Broadcasting Systems for Television, Sound and Data Services: Frame Instructor, Channel Coding and Modulation for Digital Terrestrial Television"

NPL 3: ETSI World Class Standards, [available on line at <http://www.etsi.org> as of Feb. 25, 2010]

SUMMARY OF INVENTION

Technical Problem

The aim of the present invention is to improve the efficiency of the transmission of digital broadcast data over systems with a plurality of physical layer pipes (including the case of a single physical layer pipe), and to prevent inconsistencies in setting the values of corresponding parameters differently at different protocol layers.

Solution to Problem

This is achieved by the features as set forth in the independent claims.

Preferred embodiments of the present invention form the subject matter of the dependent claims.

It is the particular approach of the present invention to signal all parameters applicable to a complete physical layer pipe only as a part of layer 1 signalling instead of providing them on a per baseband frame basis.

Providing the signalling per physical layer pipe on layer 1 requires less transmission resources than signalling of the information in each baseband frame mapped to a physical layer pipe. Moreover, by signalling the information related to a physical layer pipe only within the layer 1 signalling and deriving the configuration for the baseband frames accordingly instead of explicit signalling in the baseband frame header avoids inconsistencies in setting corresponding parameters in different structures. Another advantage of the present invention lays in the fact that the robustness for the different physical layer pipes—of which one or more carry layer 1 signalling partly or completely—as well as for the pre-amble symbols that might carry layer 1 signalling partly or completely can be chosen independently from each other. This is not the case for signalling in the baseband frame headers since the robustness of the baseband frame transmission depends on the configuration of the particular physical layer pipe. Thus, thanks to moving a part of the baseband frame header signalling to the layer 1 signalling, the present invention enables applying the desired robustness for both, content and PLP-specific signalling, separately.

In accordance with an aspect of the present invention, a method for transmitting, in a digital broadcast network using a plurality of physical layer pipes (including the case of a single physical layer pipe), digital broadcast data encapsulated into one or more baseband frames is provided. Each baseband frame has a header of a predefined format. The physical layer forward error correction coding is applied to the baseband frames and mapped on at least one physical layer pipe. The method comprises configuring a parameter of a physical layer pipe and applying the parameter settings to each baseband frame transmitted within said physical layer pipe. The parameter indicates either of an input stream format, a single or a multiple input stream, constant or variable coding and modulation, presence of input stream synchronization, presence of null packet deletion, or input stream identifier. The method further includes transmitting the configured parameter within physical layer signalling related to said physical layer pipe, and transmitting within said physical layer pipe baseband frames that do not include in their headers the configured parameter.

In accordance with another aspect of the present invention, a method for receiving, in a digital broadcast network using a plurality of physical layer pipes (including the case of a single physical layer pipe), digital broadcast data encapsulated into one or more baseband frames is provided. Each baseband frame has a header of a predefined format. The physical layer forward error correction coding is applied to the baseband frames and demapped from at least one physical layer pipe. The method comprises receiving a parameter describing the configuration of a physical layer pipe within layer 1 signalling related to said physical layer pipe, the parameter indicating either of an input stream format, a single or a multiple input stream, constant or adaptive coding and modulation, presence of input stream synchronization, presence of null packet deletion, or input stream identifier. The method further comprises decoding the parameter of said physical layer pipe and applying the signalled configuration to each baseband frame received within said physical layer pipe, and receiving within said physical layer pipe baseband frames that do not include in their headers the configured parameter.

In accordance with still another aspect of the present invention, an apparatus is provided for transmitting, in a digital broadcast network using a plurality of physical layer pipes (including the case of a single physical layer pipe), digital broadcast data encapsulated into one or more baseband frames. Each baseband frame has a header of a predefined format. The physical layer forward error correction coding is applied to the baseband frames and mapped on at least one physical layer pipe. The apparatus comprises a parameter setting unit for configuring a parameter of a physical layer pipe and applying the parameter settings to each baseband frame transmitted within said physical layer pipe, the parameter indicating either of an input stream format, a single or a multiple input stream, constant or adaptive coding and modulation, presence of input stream synchronization, presence of null packet deletion, or input stream identifier. The apparatus further comprises a signalling transmitting unit for transmitting the configured parameter within physical layer signalling related to said physical layer pipe, and a data transmitting unit for transmitting within said physical layer pipe baseband frames that do not include in their headers the configured parameter.

In accordance with still another aspect of the present invention, an apparatus is provided for receiving, in a digital broadcast network using a plurality of physical layer pipes (including the case of a single physical layer pipe), digital broadcast data encapsulated into one or more baseband frames. Each baseband frame has a header of a predefined format. The physical layer forward error correction coding is applied to the baseband frames and demapped from at least one physical layer pipe. The receiving apparatus includes a signalling receiving unit for receiving a parameter describing the configuration of a physical layer pipe within physical layer signalling related to said physical layer pipe, the parameter indicating either of an input stream format, a single or a multiple input stream, constant or adaptive coding and modulation, presence of input stream synchronization, presence of null packet deletion, or input stream identifier. The apparatus further comprises a PLP determining unit for decoding the parameter of said physical layer pipe and applying the signalled configuration to each baseband frame received within said physical layer pipe, and a data receiving unit for receiving within said physical layer pipe baseband frames that do not include in their headers the configured parameter. Note that the "receiving apparatus" may be embodied as a "receiver" or a "receiving device" described below in the embodiments of the present invention.

Preferably, each of the parameters indicating an input stream format (220), presence of input stream synchronization, presence of NULL packet deletion, and input stream identifier are signalled within the layer 1 signalling. Carrying all these parameters within the layer 1 signalling allows for header size reduction of baseband frames, thus improving considerably the transmission efficiency.

According to an embodiment of the present invention, the baseband frame header only carries parameters indicating any of a length of the baseband frame data field, distance to the start of the first user packet within the baseband frame, input stream synchronization settings, or parity bits for error detection.

Preferably, the parameter indicating a single or a multiple input stream is signalled within the layer 1 as a number of physical layer pipes (PLP_NUM) and/or the parameter indicating a constant or variable coding and modulation (225) is signalled within the layer 1 as a parameter for specifying coding rate (PLP_COD) and as a parameter for specifying modulation (PLP_MOD) applied to the physical layer pipe.

Advantageously, the digital broadcast network is a network based on DVB-T2 specification or its enhanced versions and the parameter is signalled within layer 1 post configurable signalling.

In accordance with another aspect of the present invention, a computer-readable medium having a computer-readable program code embodied thereon is provided, the program code being adapted to cause a computer to carry out the transmission method and/or the reception method according to the present invention.

The above objectives and other objectives and features of the present invention will become more apparent from the following description and preferred embodiments given in conjunction with the accompanying drawings.

DESCRIPTION OF EMBODIMENTS

Embodiments

The present invention relates to signalling in the header of baseband frames having a fixed and configurable size and being used for transporting content data and meta-data via communication links of a digital broadcast system. The invention also relates to the layer 1 signalling in the digital broadcasting system.

The present invention provides an improved signalling related to the transmission of data in a digital broadcast network supporting a plurality of physical layer pipes (including the case of a single physical layer pipe). In particular, the parameters applicable to an entire physical layer pipe are a part of the layer 1 signalling, and all baseband frames associated with said physical layer pipe are configured accordingly so that no additional signalling of these parameters within the baseband frame header is necessary.

The following now describes embodiments of the present invention, with reference to the accompanying drawings.

Figure 1A:
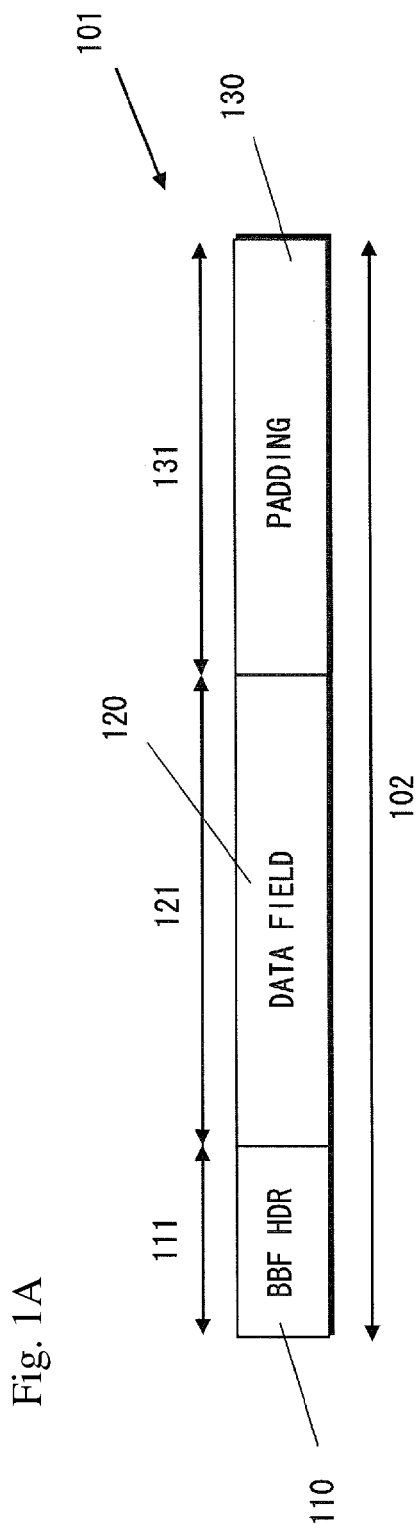
FIG. 1A is a schematic drawing illustrating the format of a baseband frame according to a DVB-T2 specification.
Figure 1B:
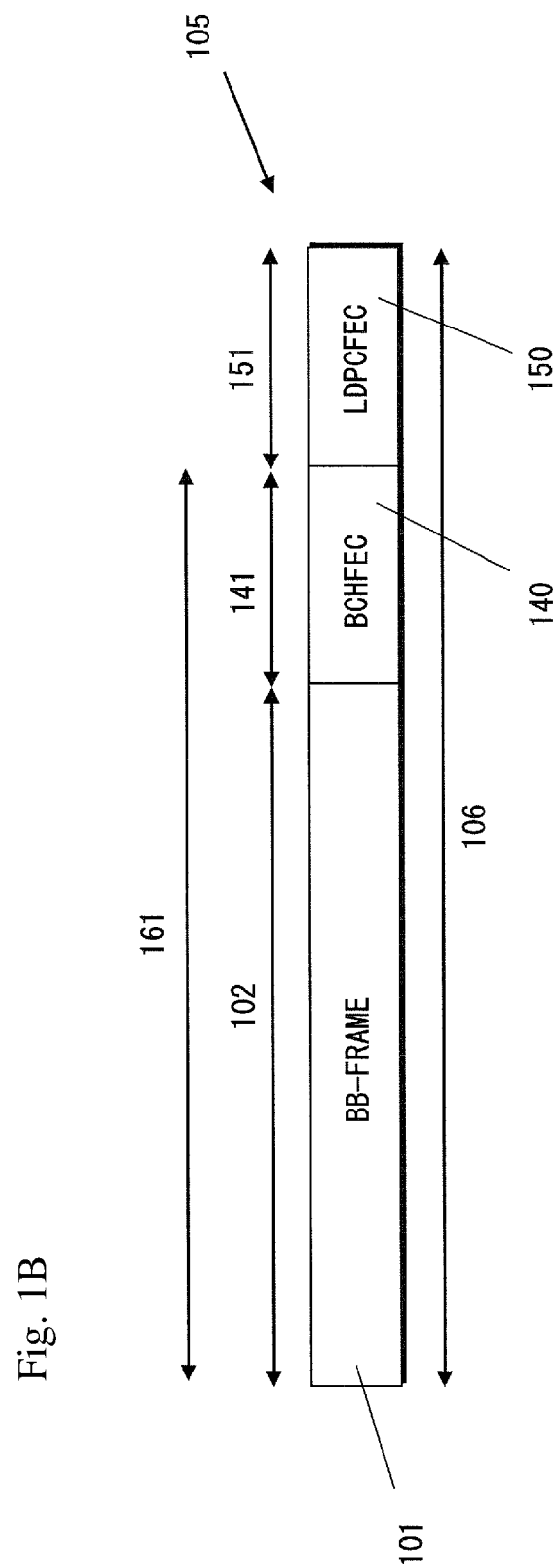
FIG. 1B is a schematic drawing illustrating the format of a forward error correction (FEC) frame according to a DVB-T2 specification.
Figure 2:
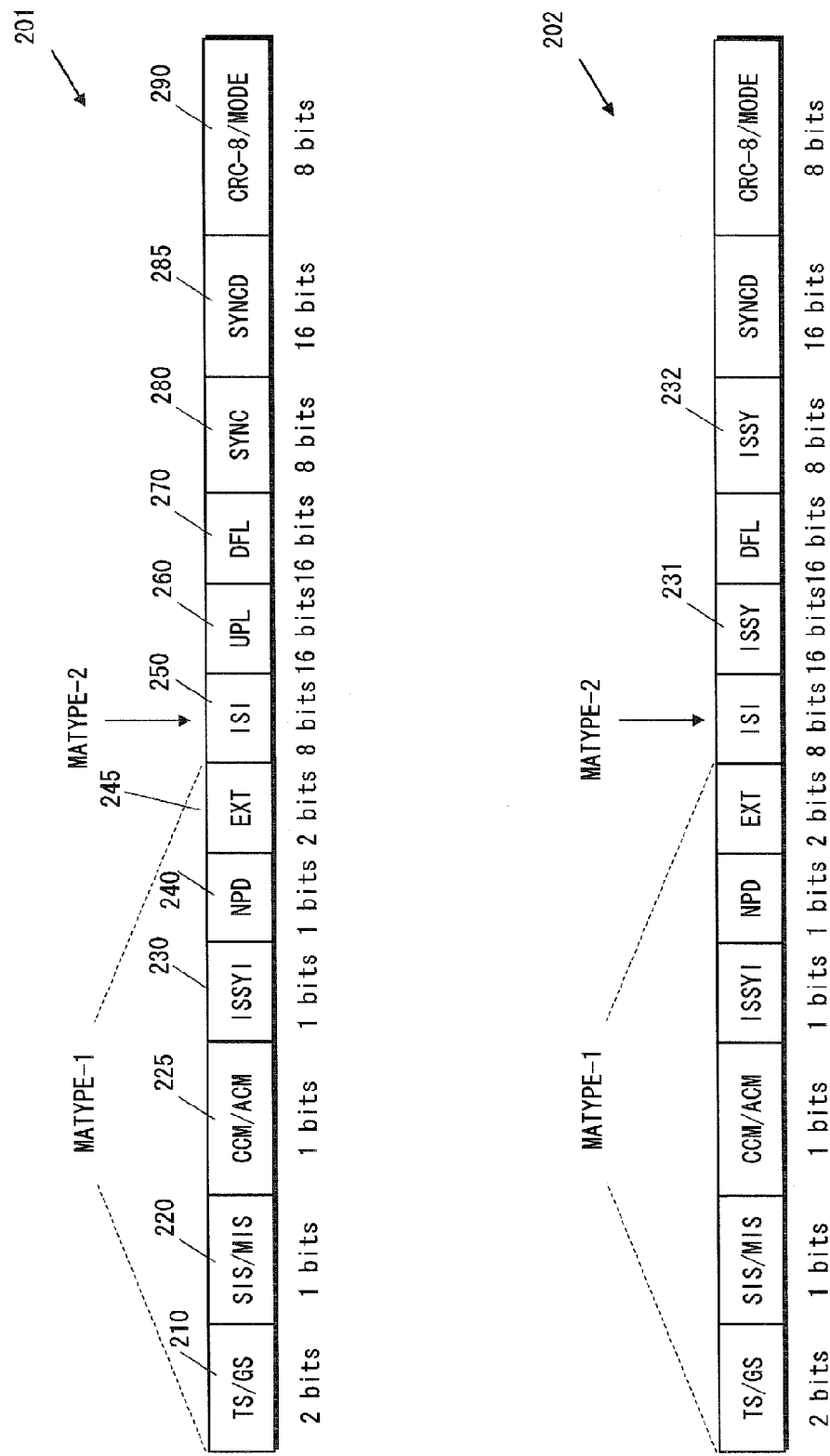
FIG. 2 is a schematic drawing illustrating the format of a baseband frame header in a normal mode and in a high efficiency mode available in DVB-T2.

Regarding the indicators (parameters) transported in the field of the baseband frame header as illustrated in FIG. 2, most of them are common to baseband frames within a single physical layer pipe. According to the present invention, such indicators (i.e., indicators or parameters common to baseband frames) are transmitted within a layer 1 signalling for a physical layer pipe and applied to all baseband frames mapped on that physical layer pipe.

Indication of particular elements being part of a physical layer pipe or signalling of the mode of operation is not applicable to each baseband frame. Such information, generically applicable to the whole PLP, is more suitably located within layer 1 signalling.

Figure 3:
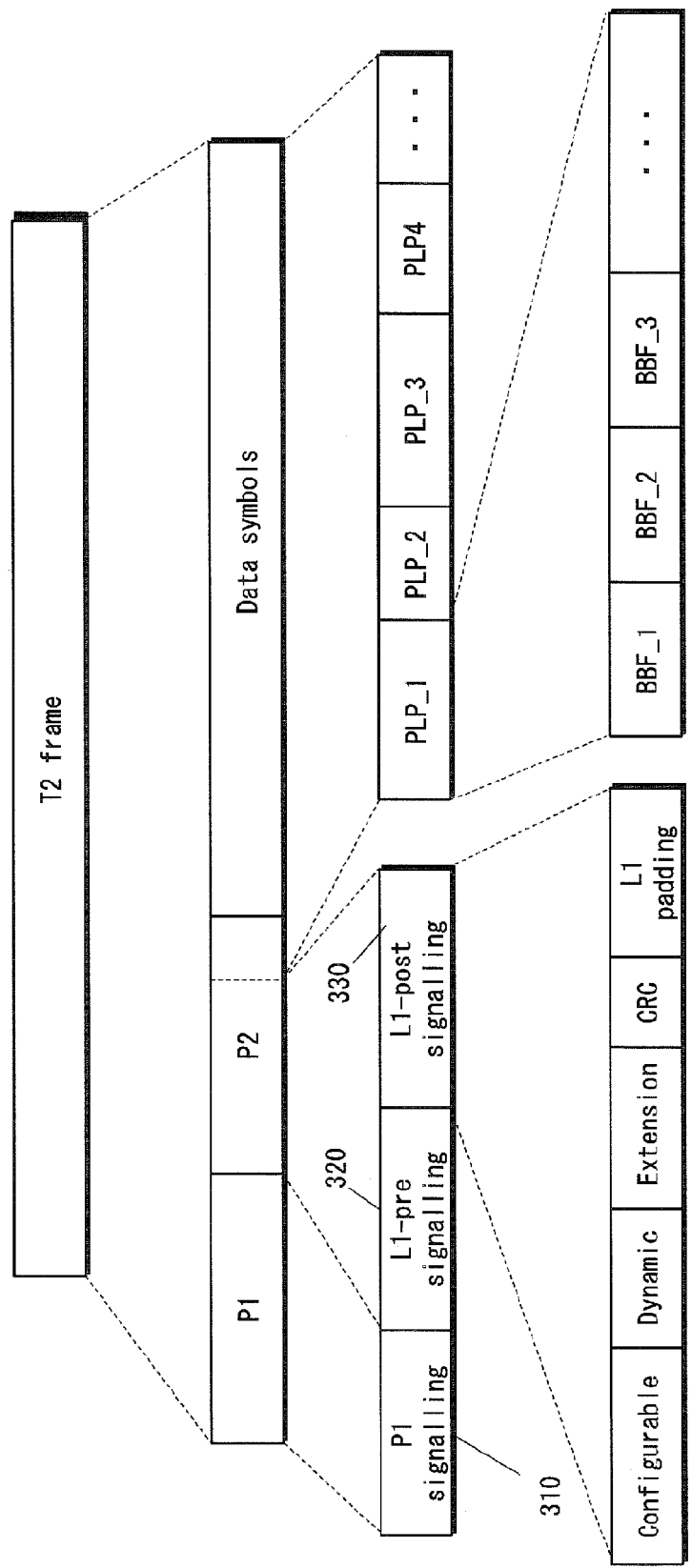
FIG. 3 is a schematic drawing illustrating layer 1 signalling according to DVB-T2 specification.

FIG. 3 shows the existing layer 1 signalling being part of DVB-T2. It consists of three elements:
  P1 signalling 310 (layer 1 signalling in pre-amble symbol 1)
  L1-pre signalling 320
  L1-post signalling 330 (including a configurable and a dynamic part).

A detailed description of the physical layer parameters and frame structure can be found in Non-Patent Literature 3, clause 7, which is incorporated herein by reference.

As illustrated in FIG. 3, the configured PLPs are multiplexed in the data symbol field and P2 symbol field (if any space left) of the T2 frame (transmission frame). The data length of each PLP may mutually differ and is defined in the PLP loop of L1-post configurable. Each PLP is composed of one or more baseband frame of fixed length. FIG. 3 illustrates a typical example in which PLP_1 includes baseband frames BBF_1, BBF_2, BBF_3 . . . and baseband flames included in the other PLPs are not illustrated.

Figure 4:
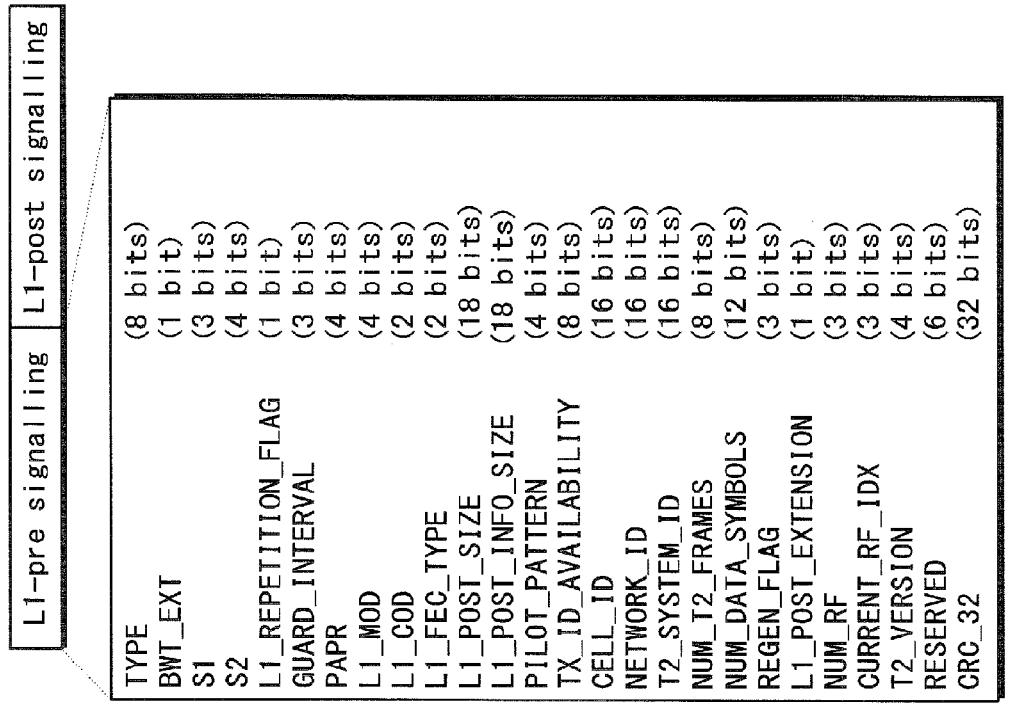
FIG. 4 is a table illustrating the parameters of the L1-pre signalling according to DVB-T2 specification.
Figure 5:
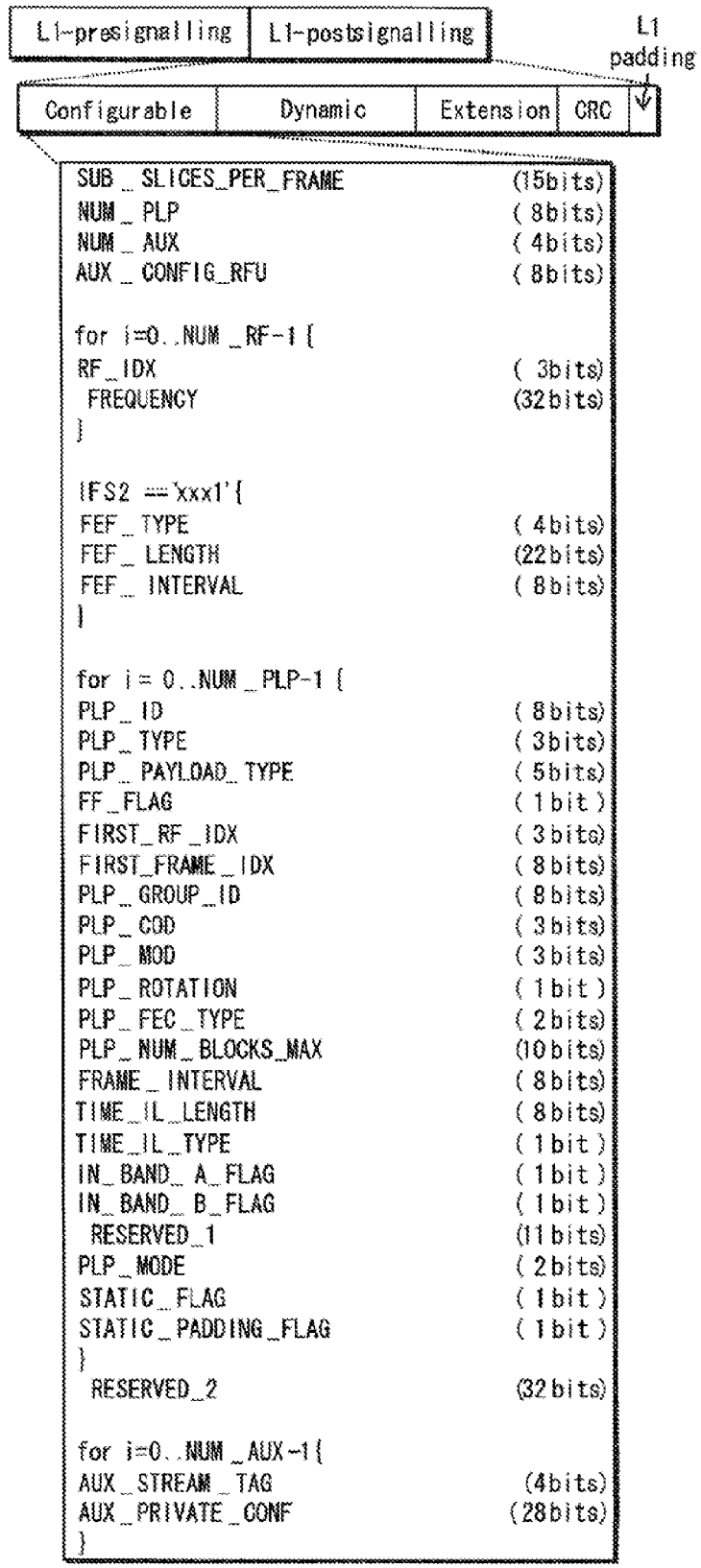
FIG. 5 is a table illustrating the parameters of the L1-post configurable signalling according to DVB-T2 specification.
Figure 6:
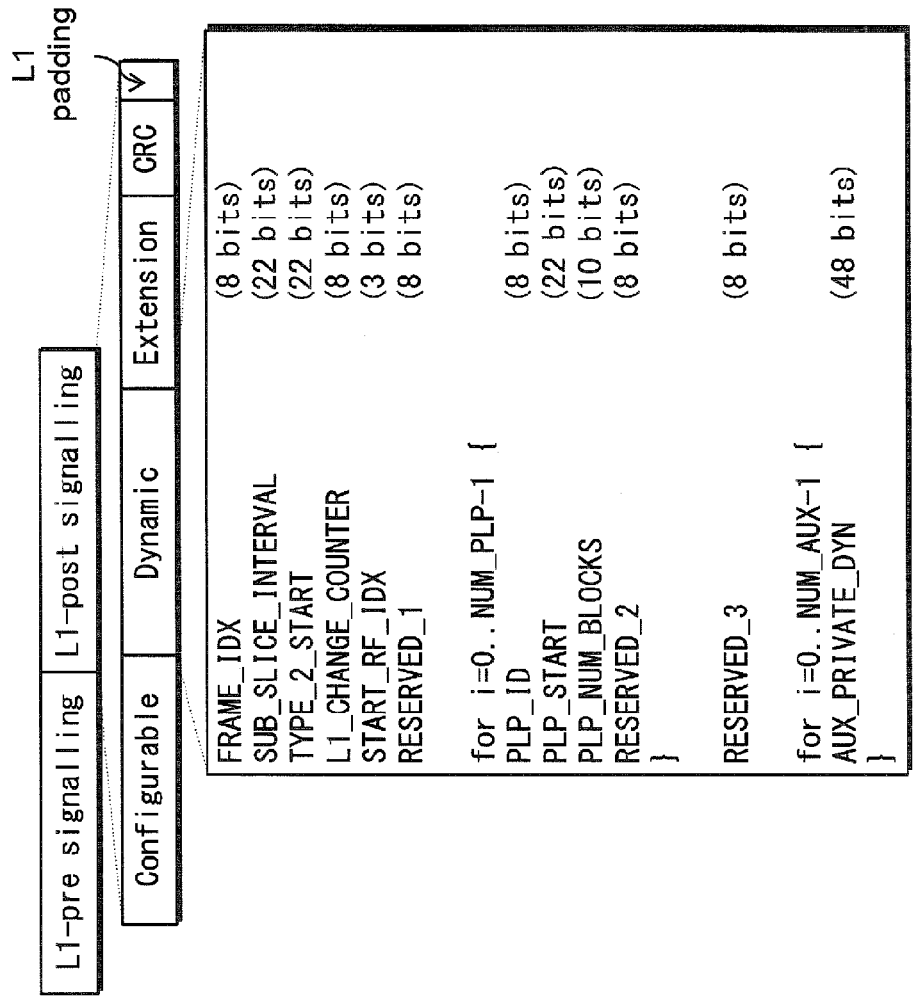
FIG. 6 is a table illustrating the parameters of the L1-post dynamic signalling according to DVB-T2 specification.

In particular, FIG. 4 shows layer 1 pre-signalling 320 parameters. FIGS. 5 and 6 show layer 1 post-signalling 330 parameters.

As can be seen from FIGS. 5 and 6, the number of PLP related attributes is signaled with the L1-post configurable part (cf. PLP loop starting with "for i=0 . . . NUM_PLP-1" in FIG. 5).

A part of the PLP attributes is signaled in a duplicated way in L1 post-configurable signalling and in the headers of the baseband frames that are used to transport user packets through the physical layer pipes offered by the broadcasting system.

The input stream format indicator TS/GS 210 in the baseband frame header indicates distinction between transport streams and generic streams. The same distinction is also provided by a layer 1 parameter "PLP_PAYLOAD_TYPE". In particular, the 5-bit long parameter "PLP_PAYLOAD_TYPE" distinguishes between GFPS, GCS, GSE and TS, the remaining signalling combinations are reserved for future use. In addition, another layer 1 parameter "TYPE" (cf. FIG. 4, L1-pre signalling) specifies the types of the input streams carried in the multiplex, i.e., within the current T2 super-frame. Consequently, in accordance with an embodiment of the present invention, the TS/GS indicator 210 is omitted from the header of baseband packets. At the receiver, the corresponding information is determined preferably from the "PLP_PAYLOAD_TYPE" layer 1 parameter.

The SIS/MIS indicator 220 in the baseband frame header indicates the presence of either a single input stream or multiple input streams. An 8-bits long layer 1 parameter "NUM_PLP" (cf. FIG. 5) provides information about the number of physical layer pipes in the multiplex. Thus, based on the number of physical layer pipes, the indication by the SIS/MIS indicator 220 about whether there is a single input stream or multiple input streams may be derived. In accordance with another embodiment of the present invention, thus, the SIS/MIS indicator 220 is no more transmitted within the baseband frame header. If the number of physical layer pipes indicated by "NUM_PLP", which is one of the layer 1 parameters, is 1, SIS/MIS indicator indicating single input stream is derived. Otherwise, that is, if the number of physical layer pipes indicated by "NUM_PLP", which is one of the layer 1 parameters, is 2 or greater, SIS/MIS indicator indicating multiple input streams is derived. In the T2 and C2 cases input streams and PLPs are identical.

The CCM/ACM indicator 225 indicates whether the modulation applied to all the PLPs included in the frame is a constant coding and modulation or advanced/variable coding and modulation. On layer 1, more detailed information is provided within parameters "PLP_COD" and "PLP_MOD" (cf. FIG. 5). In particular, the parameter "PLP_COD" specifies for a physical layer pipe the code rate, and the parameter "PLP_MOD" specifies for a physical layer pipe a modulation constellation. Thus, in accordance with yet another embodiment of the present invention, the CCM/ACM indicator 225 is advantageously derived from the "PLP_COD" and "PLP_MOD", which are layer 1 parameters. In particular, if there are equal settings of "PLP_COD" and "PLP_MOD" for the respective configured physical layer pipes, the CCM/ACM indicator is derived to indicate constant coding and modulation. Otherwise, that is, if the settings of "PLP_COD" for any of the configured physical layer pipes differs from others and/or if the settings of "PLP_MOD" for any of the configured physical layer pipes differs from others, the CCM/ACM indicator is then derived to indicate variable coding and modulation.

The input stream synchronization indicator ISSYI 230, which indicates whether the ISSY field is valid or not, does not have an equivalent on layer 1 so far. However, providing ISSYI 230 on baseband frame level is not required since input stream synchronization is a PLP specific parameter, rather than a baseband frame specific parameter. Therefore, preferably, signalling of ISSYI 230 is moved from the baseband frames to layer 1. For instance, a new parameter "PLP_ISSYI" may be included into the PLP loop of the layer 1 post-configurable signalling part.

The NPD 240, which is an indicator of NULL packet deletion, also does not have an equivalent on layer 1 so far. However, since NPD is of the same nature as ISSYI above, NPD 240 is preferably signaled within layer 1. For instance, a new parameter "PLP_NPDI" may be included into the PLP loop of the layer 1 post-configurable signalling part.

An example of including the new parameters into the PLP loop shown in FIG. 5 is as follows.

```
for i=0. .NUM_PLP-1
{
    PLP_ID            // 8 bit: PLP ID
    PLP_PAYLOAD_TYPE  // 5 bit: TS, IP, etc.
    ...
    PLP_ISSYI         // 1 bit: ISSY indication
    PLP_NPDI          // 1 bit: Null packet deletion indication
    ...
    PLP_COD           // 3 bit: coding
    PLP_MOD           // 3 bit: modulation
    ...
}
```

The field EXT 245 does not have any function assigned until now. Thus, this parameter may be removed. Instead, a signalling parameter reserved for further use on layer 1 may be utilized in future, if necessary.

Regarding the MATYPE-2 field, the ISI 250 is an input stream identifier. It corresponds to the physical layer parameter PLP_ID (cf. FIG. 5) and uniquely identifies the physical layer pipe. A receiver can identify the relationship between the physical layer pipes and their position in the transmission frame by means of a start address (of the first cell belonging to the desired PLP) and the number of OFDM cells (an OFDM cell corresponds to the modulation value for one OFDM carrier (i.e., sub-carriers) during one OFDM symbol, e.g. a single constellation point, see e.g. Non-Patent Literature 1, clause 8) occupied by PLP. Based thereon, a receiver can unambiguously demultiplexes the PLPs from the transmission frames. Accordingly, it is not necessary to assign a PLP_ID/ISI to each baseband frame since each baseband frame is a part of the desired PLP. If a receiver need to handle different PLPs in parallel and there is a risk of mixing-up baseband frames stemming from different PLPs, the receiver can assign PLP identifiers taken from the L1-post signalling or assign such in an arbitrary way. Hence the MATYPE-2 field together with the input stream identifier is not required for a proper operation. According to still another embodiment of the present invention, MATTYPE-2 field is not transmitted in the baseband frame header.

Figure 7:
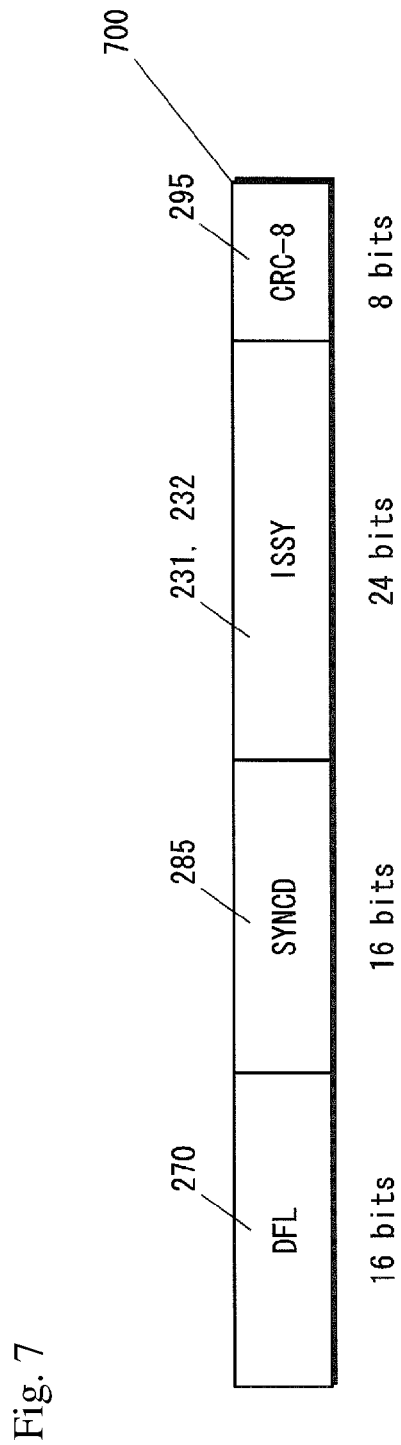
FIG. 7 is a schematic drawing illustrating the format of a baseband frame header in accordance with an embodiment of the present invention.

FIG. 7 illustrates a new baseband frame header in accordance with a preferred embodiment of the present invention. The new baseband frame header 700 only includes the following fields.

Data Field Length Indicator DFL 270

The data field length indicator DFL 270 has a length of 16 bits and indicates the data field length.

SYNCD Field 285

The SYNCD field 285 has a length of two bytes and indicates the distance to the first user packet in the data field 120 of the baseband frame 101, wherein the distance is in bytes.

ISSY 231 and ISSY 232

The optional input stream synchronisation ISSY 231 and 232 with a length of 24 bits (indicated, by ISSYI within layer 1 signalling, whether ISSY 231 and 232 is valid).

CRC-8 Field 295

The CRC-8 field 295 is for error detection in the baseband frame header 700.

Accordingly, the size of the baseband frame header has been reduced from the original size of 80 bits to 64 bits. Regarding the ISSY fields 231 and 232, this parameter is optional and its presence is signaled preferably by means of layer 1 signalling.

The parameter field ISSY (3 bytes) is optional. Its presence is signaled by means of aforementioned layer 1 signalling.

The new short baseband frame header as shown in FIG. 7 will be five bytes long in the absence of ISSY and eight bytes long in the presence of ISSY. Even in the case that ISSY is used for lowering the jitter during play-out, it would be sufficient to insert the corresponding field only in the first baseband frame(s) of an interleaving frame (unit over which dynamic capacity allocation for a particular PLP is carried out, made up of an integer, dynamically varying number of FEC frame and having a fixed relationship to the frames). This application would require further signalling on the layer 1 for indicating whether the ISSY is present only in first baseband frames, or in each of them, or whether it is omitted. Such a signalling may be achieved, for instance, by extending the range of the ISSYI indicator 230 signaled preferably on the layer 1 as described above.

The present invention thus provides a higher efficiency by means of lower signalling overhead. Baseband frame headers are reduced to the absolutely necessary number of parameter fields truly applicable on the baseband frame level. A priori information that can be derived from other parameters is not explicitly repeated anymore. Moreover, the present invention provides a correct layered approach in conformity with both layer 1 signalling and signalling within the baseband frame headers and achieves to prevent ambiguities by avoiding signalling of redundant or duplicate information. The PLP-specific parameters are now moved to the correct signalling layer. These are parameters that are not baseband frame specific. Parameters already existing on the correct layer 1 signalling in parallel are not duplicated anymore, hence no contradictory settings can occur anymore.

Figure 8:
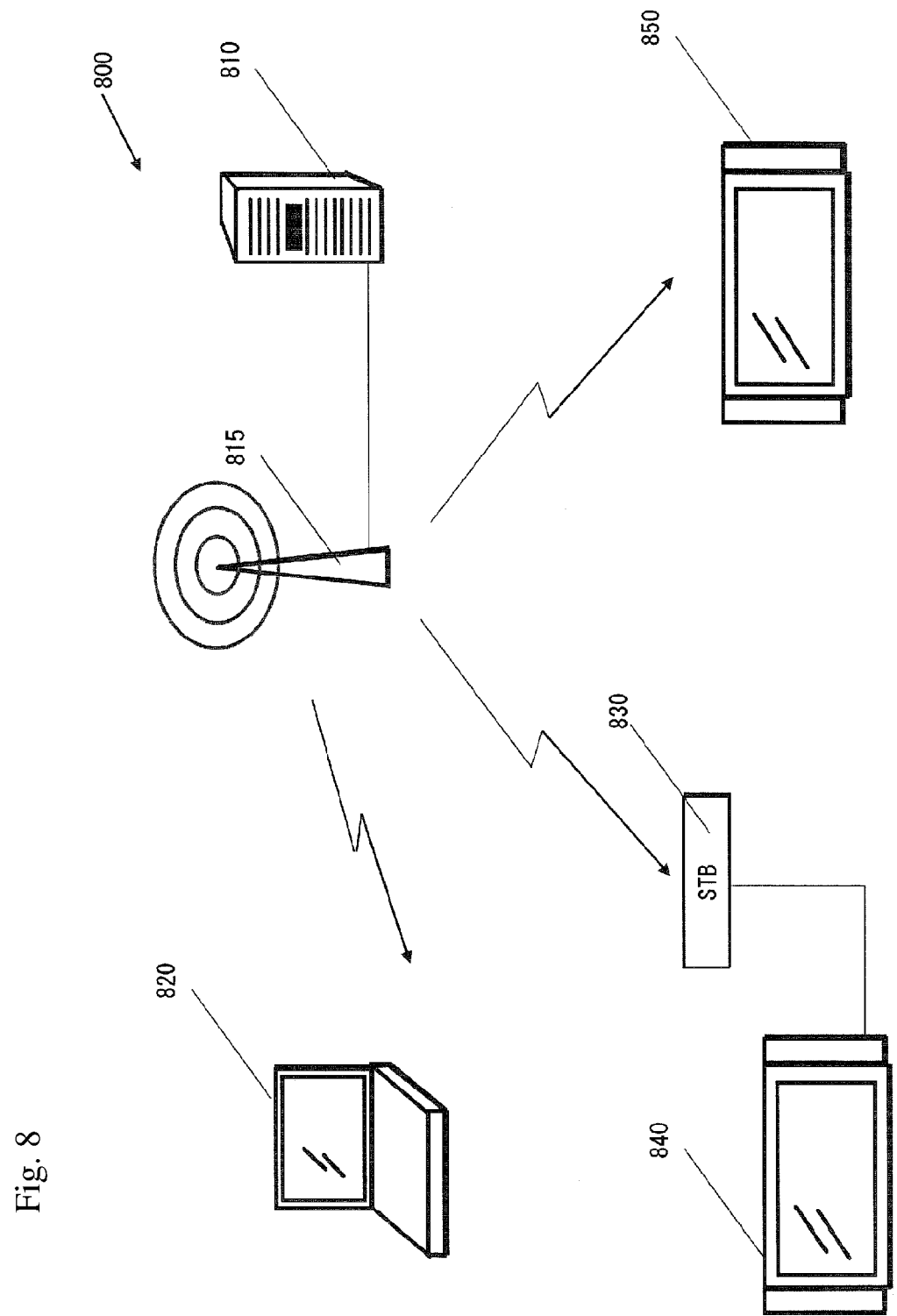
FIG. 8 is a schematic drawing illustrating an example of a digital broadcast system for applying the present invention.

FIG. 8 shows an example of a digital broadcast system 800 in which the present invention may be applied. A transmitting apparatus 810 may implement the super-high efficiency mode (PLP_MODE) employing the short baseband frames of the present invention as described above, for instance, with reference to FIG. 9, transmitter 900a. The transmitting apparatus 810 may be a single device or a plurality of interconnected devices. The transmitting station 815 transmits the broadcast signal formed by the transmitting apparatus 810. In this example shown in FIG. 8, a terrestrial digital broadcast system is illustrated. However, the present invention is not limited thereto and may also be applied to a satellite, a cable or a hybrid form of transmission (i.e. a combination of different forms of transmission, e.g. terrestrial and satellite), or to a digital broadcast transmission over any other media. One of the receiving apparatuses illustrated in FIG. 8 is a computer such as a portable or a personal computer 820. It may, however, be also a handheld device or a mobile telephone capable of receiving the digital broadcast. Another example receiving apparatuses are a set top box 830 connected to a digital or analog TV 840 or a digital TV 850 with integrated broadcast receiver. These example receiving devices and other receiving devices capable of receiving digital broadcast may implement the header decompression according to the present invention as described above, for instance, with reference to FIG. 9, receiver 900b.

Figure 9:
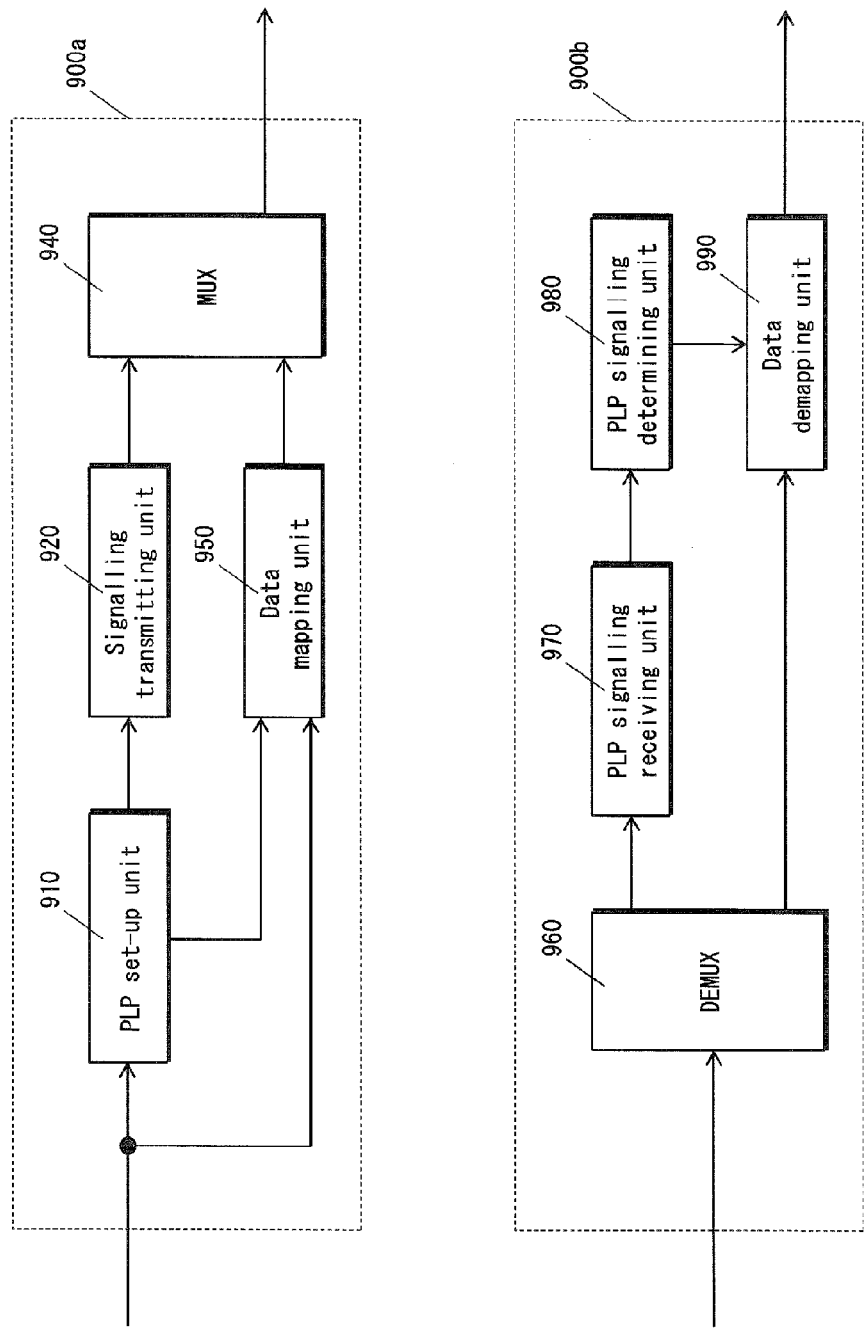
FIG. 9 is a block diagram illustrating a transmitter and a receiver according to an example of the present invention.

FIG. 9 illustrates an example transmitter 900a and receiver 900b in accordance with the present invention. The transmitter 900a includes a PLP set-up unit 910, a signalling transmitting unit 920, a data mapping unit 950, and a multiplexer (MUX) 940. The receiver 900b includes a demultiplexer (DEMUX) 960, a PLP signalling receiving unit 970, a PLP signalling determining unit 980, and a data demapping unit 990.

The input stream data (video or audio or other) are provided to the PLP set-up unit 910 which configures the PLP(s) for the transmission of data. In particular, the PLP set-up unit 910 configures at least one of the parameters, namely the TS/GS indicator 210, SIS/MIS indicator 220, CCM/ACM indicator 225, ISSYI 230, NPD indicator 240, or ISI 250. The configuration is notified to the signalling transmitting unit 920 and the data mapping unit 950. In particular, the signalling relates to a particular physical layer pipe used for the transmission of data, and the data are transmitted from the data mapping unit 950 to the multiplexer 940 accordingly. In other words, the baseband frames are configured accordingly to be mapped on the physical layer pipe are transmitted from the data mapping unit 950 to the multiplexer 940. For the transmission over the channel, the signalling and the data are multiplexed by the multiplexer 940 to the transmission frames (e.g. T2 frames). The baseband frame header data does not carry the configured parameters.

Correspondingly, in the receiver 900b, the demultiplexer 960 demultiplexes the data and the layer 1 signalling information, and the PLP signalling receiving unit 970 receives the configured parameter(s). Then, based on the signalling information related to a particular physical layer pipe, the signalling determining unit 980 determines the configuration of the received PLP and notifies the data demapping unit 990 about the determined configuration of the baseband frames. Based on the notified baseband frame configuration, the data demapping unit 990 reconfigures user packets from the baseband frames included in the received PLP and outputs the reconfigured user packets.

That is, according to the above embodiments of the present invention. it is preferable that the PLP set-up unit 910 of the transmitter 900a configures the parameters as illustrated in FIG. 7 and include the parameters in a baseband frame header and also configure the parameters as illustrated in FIG. 5 and included the parameters in the PLP loop. More preferably, the PLP set-up unit 910 configures the parameters "PLP_ISSYI" and "PLP_NPDI" in the PLP loop illustrated in FIG. 7. Each baseband frame included in PLP has a header of the configuration illustrated in FIG. 7 and multiplexed in the PLP. In addition, one or more PLPs are multiplexed in the data symbols field of the frame. The receiver 900b receives the frame into which one or more PLPs are multiplexed. In each PLP, baseband frames each having a header configured as illustrated in FIG. 7 are multiplexed. Note the individual indicators constituting a baseband frame are as illustrated in FIG. 7, namely the DFL 270, SYNCD 285, ISSY 231, 232, and CRC-8 295, and generated as described in Non-Patent Literature 2. Therefore, no detailed description is given of how the those indicators are generated. Regarding indicators specific to each baseband frame included in a PLP, the PLP signalling determining unit 980 determines such indicators from the baseband frame header configured as illustrated in FIG. 7. Regarding the rest of indicators, the PLP signalling determining unit 980 determines such indicators from the PLP loop of the layer 1 post-configurable signalling part (cf. FIG. 5). Still more preferably, if parameters "PLP_ISSYI" and "PLP_NPDI" described above are included in the PLP loop, the PLP signalling determining unit 980 also uses the parameters "PLP_ISSYI" and "PLP_NPDI" to determine information specific to the baseband frames included in the PLP.

In this way, the header of each baseband frame included in PLP is reduced in length to improve the data transmission efficiency.

Another embodiment of the invention relates to the implementation of the above described various embodiments using hardware and software. It is recognized that the various embodiments of the invention may be implemented or performed using computing devices (processors). A computing device or processor may for example be general-purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Most of the examples have been outlined in relation to a DVB-T2-based digital broadcasting system, and the terminology mainly relates to the DVB terminology. However, this terminology and the description of the various embodiments with respect to DVB-T2-based broadcasting is not intended to limit the principles and ideas of the invention to such systems. Also the detailed explanations of the encoding and decoding in compliance with the DVB-T2 standard are intended to better understand the exemplary embodiments described herein and should not be understood as limiting the invention to the described specific implementations of processes and functions in the digital broadcasting. Nevertheless, the improvements proposed herein may be readily applied in the broadcasting systems described. Furthermore the concept of the invention may be also readily used in the enhancements of DVB-T2 currently discussed in standardization.

The following describes exemplary applications of the transmission and reception methods described in the above embodiments and an exemplary structure of a system suitable for the methods.

Figure 10:
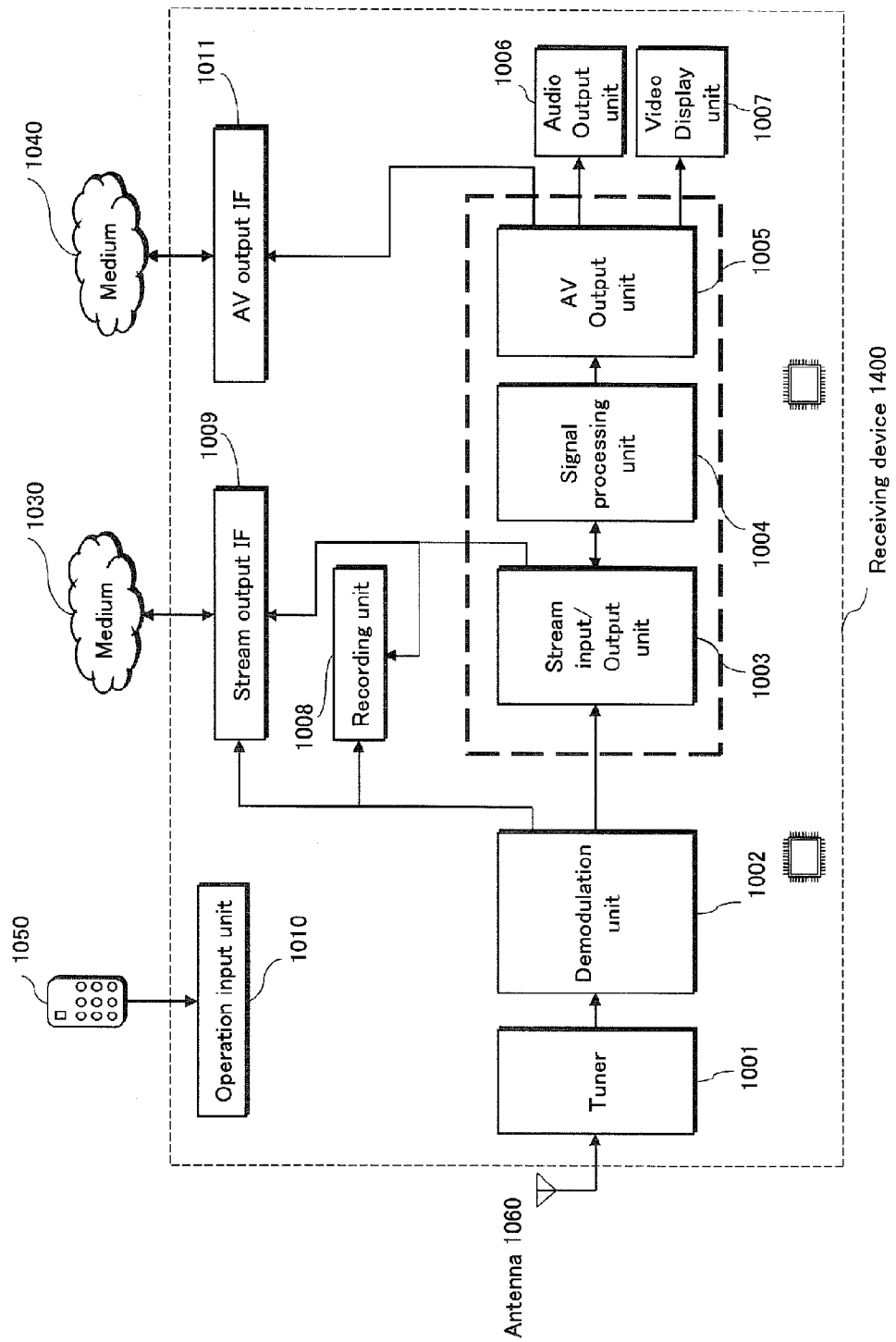
FIG. 10 is a schematic drawing illustrating an example of a receiving device.

FIG. 10 is a schematic view illustrating an exemplary structure of a receiving device 1000 for carrying out the reception methods described in the above embodiments. As illustrated in FIG. 10, in one exemplary structure, the receiving device 1000 may be composed of a modem portion implemented on a single LSI (or a single chip set) and a codec portion implemented on another single LSI (or another single chip set). The receiving device 1000 illustrated in FIG. 10 is a component that is included, for example, in the TV (television receiver) 850, the STB (Set Top Box) 840, the computer 820, such as a personal computer, handheld device, or mobile telephone, illustrated in FIG. 8. The receiving device 1000 includes an antenna 1060 for receiving a high-frequency signal, a tuner 1001 for transforming the received signal into a baseband signal, and a demodulation unit 1002 for demodulating user packets from the baseband signal obtained by frequency conversion. The receiver 900*b* described in the above embodiments corresponds to the demodulation unit 1002 and executes any of the reception methods described in the above embodiments to receive user packets. As a consequence, the advantageous effects of the present invention described relative to the above embodiments are produced.

The following description is directed to the case where received user packets include video data and audio data. The video data has been encoded with a moving picture coding method compliant with a given standard, such as MPEG2. MPEG4-Advanced Video Coding (AVC) or VC-1. The audio data has been encoded with an audio coding method compliant with a given standard, such as Dolby Audio Coding (AC)-3. Dolby Digital Plus, Meridian Lossless Packing (MLP), Digital Theater Systems (DTS), DTS-HD, or Pulse Coding Modulation (PCM).

The receiving device 1000 includes a stream input/output unit 1020, a signal processing unit 1004, an audio and visual output unit (hereinafter, AV output unit) 1005, an audio output unit 1006, and a video display unit 1007. The stream input/output unit 1020 demultiplexes video and audio data from user packets obtained by the demodulation unit 1002. The signal processing unit 1004 decodes the demultiplexed video data into a video signal, using an appropriate moving picture decoding method and also decodes the demultiplexed audio data into an audio signal using an appropriate audio decoding method. The AV output unit 1005 outputs a video signal and an audio signal to an audio and visual output interface (hereinafter, AV output IF) 1011. The audio output unit 1006, such as a speaker, produces audio output according to the decoded audio signal. The video display unit 1007, such as a display monitor, produces video output according to the decoded video signal. For example, the user may operate the remote control 1050 to select a channel (of a TV program or audio broadcast), so that information indicative of the selected channel is transmitted to an operation input unit 1010. In response, the receiving device 1000 demodulates, from among signals received with the antenna 1060, a signal carried on the selected channel and applies error correction, so that reception data is extracted. At the time of data reception, the receiving device 1000 receives control symbols containing information indicating a transmission method of a signal carried on the selected channel, so that the information indicative of the transmission method is obtained. With this information, the receiving device 1000 is enabled to make appropriate settings for the receiving operation, demodulation method, and error correction method to duly receive user packets transmitted from a broadcast station (base station). Here, for example, symbols carried by P1-signalling, P1-pre signalling, and L1-post signalling described in the above embodiments correspond to the control symbols. Similarly, the FEC coding rate per PLP, the modulation constellation and related parameters contained in P1-signalling, P1-pre signalling, and L1-post signalling correspond to the information about the transmission method. Although the above description is directed to an example in which the user selects a channel using the remote control 1050, the same description applies to an example in which the user selects a channel using a selection key provided on the receiving device 1000.

With the above structure, the user can view a broadcast program that the receiving device 1000 receives by the reception methods described in the above embodiments.

The receiving device 1000 according to this embodiment may additionally include a recording unit (drive) 1008 for recording various data onto a recording medium, such as a magnetic disk, optical disc, or a non-volatile semiconductor memory. Examples of data to be recorded by the recording unit 1008 include data contained in user packets that are obtained as a result of demodulation and error correction by the demodulation unit 1002, data equivalent to such data (for example, data obtained by compressing the data), and data obtained by processing the moving pictures and/or audio. (Note here that there may be a case where no error correction is applied to a signal obtained as a result of demodulation by the demodulation unit 1002 and where the receiving device 1000 conducts another signal processing after error correction. The same holds in the following description where similar wording appears.) Note that the term "optical disc" used herein refers to a recording medium, such as Digital Versatile Disc (DVD) or BD (Blu-ray Disc), that is readable and writable with the use of a laser beam. Further, the term "magnetic disk" used herein refers to a recording medium, such as an floppy disk (FD, registered trademark) or hard disk, that is writable by magnetizing a magnetic substance with magnetic flux. Still further, the term "non-volatile semiconductor memory" refers to a recording medium, such as flash memory or ferroelectric random access memory, composed of semiconductor element(s). Specific examples of non-volatile semiconductor memory include an SD card using flash memory and a flash solid state drive (SSD). It should be naturally appreciated that the specific types of recording mediums mentioned herein are merely examples and any other types of recording mediums may be usable.

With the above structure, the user can record a broadcast program that the receiving device 1000 receives with any of the reception methods described in the above embodiments, and time-shift viewing of the recorded broadcast program is possibly anytime after the broadcast. In the above description of the receiving device 1000, the recording unit 1008 records user packets obtained as a result of demodulation and error correction by the demodulation unit 1002. However, the recording unit 1008 may record part of data extracted from the data contained in the user packets. For example, the user packets obtained as a result of demodulation and error correction by the demodulation unit 1002 may contain contents of data broadcast service, in addition to video data and audio data. In this case, new user packets may be generated by multiplexing the video data and audio data, without the contents of broadcast service, extracted from the user packets demodulated by the demodulation unit 1002, and the recording unit 1008 may record the newly generated user packets. In another example, new user packets may be generated by multiplexing either of the video data and audio data contained in the user packets obtained as a result of demodulation and error correction by the demodulation unit 1002, and the recording unit 1008 may record the newly generated user packets. In yet another example, the recording unit 1008 may record the contents of data broadcast service included, as described above, in the user packets.

As described above, the receiving device 1000 described in this embodiment may be included in a TV, a recorder (such as DVD recorder, Blu-ray recorder, HDD recorder, or SD card recorder), or a mobile telephone. In such a case, the user packets obtained as a result of demodulation and error correction by the demodulation unit 1002 may contain data for correcting errors (bugs) in software used to operate the TV or recorder or in software used to protect personal or confidential information. If such data is contained, the data is installed to the TV or recorder to correct the errors. Further, if data for correcting errors (bugs) in software installed in the receiving device 1000 is contained, such data is used to correct errors that the receiving device 1000 may have. This arrangement ensures more stable operation of the TV, recorder, or mobile phone in which the receiving device 1000 is implemented.

Note that it may be the stream input/output unit 1003 that performs the process of extracting data from the whole data contained in user packets obtained as a result of demodulation and error correction by the demodulation unit 1002 and then multiplexing the extracted data. More specifically, under instructions given from a control unit, such as CPU, not illustrated in the figures, the stream input/output unit 1003 demultiplexes video data, audio data, contents of data broadcast service etc. from the user packets demodulated by the demodulation unit 1002, and extracts specific pieces of data from the demultiplexed data, and multiplexes the extracted data pieces to generate new user packets. The data pieces to be extracted from demultiplexed data may be determined by the user or determined in advance for the respective types of recording mediums. With the above structure, the receiving device 1000 is enabled to extract and record only data necessary to view a recorded broadcast program, which is effective to reduce the size of data to be recorded.

In the above description, the recording unit 1008 records user packets obtained as a result of demodulation and error correction by the demodulation unit 1002. Alternatively, however, the recording unit 1008 may record new user packets generated by multiplexing video data newly generated by encoding the original video data contained in the user packets obtained as a result of demodulation and error correction by the demodulation unit 1002. Here, the moving picture coding method to be employed may be different from that used to encode the original video data, such that the data size or bit rate of the new video data is smaller than the original video data. Here, the moving picture coding method used to generate new video data may be of a different standard from that used to generate the original video data. Alternatively, both the moving picture coding methods may be of the same standard with different parameters. Similarly, the recording unit 1008 may record new user packets generated by multiplexing audio data newly obtained by encoding the original audio data contained in the user packets obtained as a result of demodulation and error correction by the demodulation unit 1002. Here, the audio coding method to be employed may be different from that used to encode the original audio data, such that the data size or bit rate of the new audio data is smaller than the original audio data.

Note that it may be the stream input/output unit 1003 and the signal processing unit 1004 that perform the process of coding the original video or audio data contained in the user packets obtained as a result of demodulation and error correction by the demodulation unit 1002 into the video or audio data of different data size or bit rate. More specifically, under instructions given from the control unit such as CPU, the stream input/output unit 1003 demultiplexes video data, audio data, contents of data broadcast service etc. from the user packets obtained as a result of demodulation and error correction by the demodulation unit 1002. Under instructions given from the control unit, the signal processing unit 1004 encodes the demultiplexed video data and audio data respectively using a motion picture coding method and an audio coding method each different from the coding method used to encode the video and audio data originally contained in the user packets. Under instructions given from the control unit, the stream input/output unit 1003 multiplexes the newly encoded video data and audio data to generate new user packets. Note that the signal processing unit 1004 may conduct the encoding of either or both of the video or audio data according to instructions given from the control unit. In addition, the sizes of video data and audio data to be obtained by encoding may be specified by a user or determined in advance for the types of recording mediums.

With the above arrangement, the receiving device 1000 is enabled to record video and audio data after converting the data to a size recordable on the recording medium or to a size or bit rate that matches the read or write rate of the recording unit 1008. This arrangement ensures that the recoding unit duly records a broadcast program, even if the user packets obtained as a result of demodulation and error correction by the demodulation unit 1002 are larger in size than the size recordable on the recording medium or higher in bit rate than the read or write rate of the recording unit. Consequently, time-shift viewing of the recorded broadcast program by the user is possible anytime after the broadcast.

Furthermore, the receiving device 1000 additionally includes a stream output interface (IF) 1009 for transmitting user packets demodulated by the demodulation unit 1002 to an external device via a transport medium 1030. In one example, the stream output IF 1009 may be a radio communication device that transmits user packets, which are obtained by demodulation, via a wireless medium (equivalent to the transport medium 1030) to an external device, using a wireless communication method compliant with a wireless communication standard, such as Wi-Fi (registered trademark, a set of standards including IEEE 802.11a. IEEE 802.11g, and IEEE 802.11n), WiGiG, Wireless HD, Bluetooth, or Zigbee. In another example, the stream output IF 1009 may be a wired communication device that transmits user packets, which are obtained by demodulation, via a transmission line (equivalent to the transport medium 1030) physically connected to the stream output IF 1009 to an external device, using a communication method compliant with wired communication standards, such as Ethernet (registered trademark), USB (Universal Serial Bus), PLC (Power Line Communication), or HDMI (High-Definition Multimedia Interface).

With the above structure, the user can use, on an external device, user packets received by the receiving device 1000 using the reception method described according to the above embodiments. The usage of user packets by a user mentioned herein include to use the user packet for real-time viewing on an external device, to record the user packets by a recording unit included in an external device, and to transmit the user packets from an external device to a yet another external device.

In the above description of the receiving device 1000, the stream output IF 1009 outputs user packets obtained as a result of demodulation and error correction by the demodulation unit 1002. However, the receiving device 1000 may output data extracted from data contained in the user packets, rather than the whole data contained in the user packets. For example, user packets obtained as a result of demodulation and error correction by the demodulation unit 1002 contain may contain contents of data broadcast service, in addition to video data and audio data. In this case, the stream output IF 1009 may output user packets newly generated by multiplexing video and audio data extracted from the user packets obtained as a result of demodulation and error correction by the demodulation unit 1002. In another example, the stream output IF 1009 may output user packets newly generated by multiplexing either of the video data and audio data contained in the user packets obtained as a result of demodulation and error correction by the demodulation unit 1002.

Note that it may be the stream input/output unit 1003 that handles extraction of data from the whole data contained in user packets obtained as a result of demodulation and error correction by the demodulation unit 1002 and multiplexing of the extracted data. More specifically, the stream input/output unit 1003 demultiplexes video data, audio data, contents of data broadcast service etc., from the user packets demodulated by the demodulation unit 1002, and extracts specific pieces of data from the demultiplexed data, and multiplexes the extracted data pieces to generate new user packets. The data pieces to be extracted from demultiplexed data may be determined by the user or determined in advance for the respective types of the stream output IF 1009.

With the above structure, the receiving device 1000 is enabled to extract and output only data necessary for an external device, which is effective to reduce the bandwidth used to output the user packets.

In the above description, the stream output IF 1009 outputs user packets obtained as a result of demodulation and error correction by the demodulation unit 1002. Alternatively, however, the stream output IF 1009 may output new user packets generated by multiplexing video data newly obtained by encoding the original video data contained in the user packets obtained as a result of demodulation and error correction by the demodulation unit 1002. The new video data is encoded with a moving picture coding method different from that used to encode the original video data, such that the data size or bit rate of the new video data is smaller than the original video data. Here, the moving picture coding method used to generate new video data may be of a different standard from that used to generate the original video data. Alternatively, the same moving picture coding method may be used but with different parameters. Similarly, the stream output IF 1009 may output new user packets generated by multiplexing audio data newly obtained by encoding the original audio data contained in the user packets obtained as a result of demodulation and error correction by the demodulation unit 1002. The new audio data is encoded with an audio coding method different from that used to encode the original audio data, such that the data size or bit rate of the new audio data is smaller than the original audio data.

The process of converting the original video or audio data contained in the user packets obtained as a result of demodulation and error correction by the demodulation unit 1002 into the video or audio data of different data size of bit rate is performed, for example, by the stream input/output unit 1003 and the signal processing unit 1004. More specifically, under instructions given from the control unit, the stream input/output unit 1003 demultiplexes video data, audio data, contents of data broadcast service etc. from the user packets obtained as a result of demodulation and error correction by the demodulation unit 1002. Under instructions given from the control unit, the signal processing unit 1004 converts the demultiplexed video data and audio data respectively using a motion picture coding method and an audio coding method each different from the method that was used in the conversion applied to obtain the video and audio data. Under instructions given from the control unit, the stream input/output unit 1003 multiplexes the newly converted video data and audio data to generate new user packets. Note that the signal processing unit 1004 may conduct the conversion of either or both of the video or audio data according to instructions given from the control unit. In addition, the sires of video data and audio data to be obtained by conversion may be specified by a user or determined in advance for the types of the stream output IF 1009.

With the above structure, the receiving device 1000 is enabled to output video and audio data after converting the data to a bit rate that matches the transfer rate between the receiving device 1000 and an external device. This arrangement ensures that even if user packets obtained as a result of demodulation and error correction by the demodulation unit 1002 are higher in bit rate than the data transfer rate to an external device, the stream output IF duly outputs new user packets at an appropriate bit rate to the external device. Consequently, the user can use the new user packets on another communication device.

Furthermore, the receiving device 1000 also includes the AV output interface 1011 that outputs video and audio signals decoded by the signal processing unit 1004 to an external device via an external transport medium 1040. In one example, the AV output IF 1011 may be a wireless communication device that transmits user packets, which are obtained by demodulation, via a wireless medium to an external device, using a wireless communication method compliant with wireless communication standards, such as Wi-Fi (registered trademark), which is a set of standards including IEEE 802.11a, IEEE 802.11g, and IEEE 802.11n, WiGiG, Wireless HD, Bluetooth, or Zigbee. In another example, the AV output IF 1011 may be a wired communication device that transmits modulated video and audio signals via a transmission line physically connected to the AV output IF 1011 to an external device, using a communication method compliant with wired communication standards, such as Ethernet (registered trademark), USB, PLC, or HDMI. In yet another example, the AV output IF 1011 may be a terminal for connecting a cable to output the video and audio signals in analog form.

With the above structure, the user is allowed to use on an external device the video and audio signals decoded by the signal processing unit 1004.

Furthermore, the receiving device 1000 additionally includes an operation input unit 1010 for receiving a user operation. According to control signals indicative of user operations input to the operation input unit 1010, the receiving device 1000 performs various operations, such as switching the power ON or OFF, switching the currently selected receive channel to another channel, switching the display of subtitle text ON or OFF, switching the display of subtitle text to another language, changing the volume of audio output of the audio output unit 1006, and changing the settings of channels that can be received.

Additionally, the receiving device 1000 may have a function of displaying the antenna level indicating the quality of the signal being received by the receiving device 1000. Note that the antenna level is an indicator of the reception quality calculated based on, for example, the Received Signal Strength Indication, Received Signal Strength Indicator (RSSI), received field strength, Carrier-to-noise power ratio (C/N), Bit Error Rate (BER), packet error rate, frame error rate, and channel state information of the signal received on the receiving device 1000. In other words, the antenna level is a signal indicating the level and quality of the received signal. In this case, the demodulation unit 1001 also serves the function of a reception quality measuring unit for measuring the received signal characteristics, such as RSSI, the received field strength, C/N, BER, packet error rate, frame error rate, and channel state information. In response to a user operation, the receiving device 1000 displays the antenna level (i.e., signal indicating the level and quality of the received signal) on the video display unit 1007 in a manner identifiable by the user. The antenna level (i.e., signal indicating the level and quality of the received signal) may be numerically displayed using a number that represents the RSSI, received field strength, C/N, BER, packet error rate, frame error rate, channel state information or the like. Alternatively, the antenna level may be displayed using an image representing the RSSI, received field strength, C/N, BER, packet error rate, frame error rate, channel state information or the like.

Although the receiving device 1000 is described above as having the audio output unit 1006, video display unit 1007, recording unit 1008, stream output IF 1009, and AV output IF 1011, it is not necessary that the receiving device 1000 has all of these units. As long as the receiving device 1000 is provided with at least one of the units 1006-1011 described above, the user is enabled to use user packets obtained as a result of demodulation and error correction by the demodulation unit 1002. It is therefore applicable that the receiving device 1000 has one or more of the above-described units in any combination depending on its application.

User Packets

The following is a detailed description of an exemplary structure of a user packet. The data structure typically used in broadcasting is an MPEG2 transport stream (TS), so that the following description is given by way of an example related to MPEG2-TS. It should be naturally appreciated, however, that the data structure of user packets transmitted by the transmission and reception methods described in the above embodiments is not limited to MPEG2-TS and the advantageous effects of the above embodiments are achieved even if any other data structure is employed.

Figure 11:
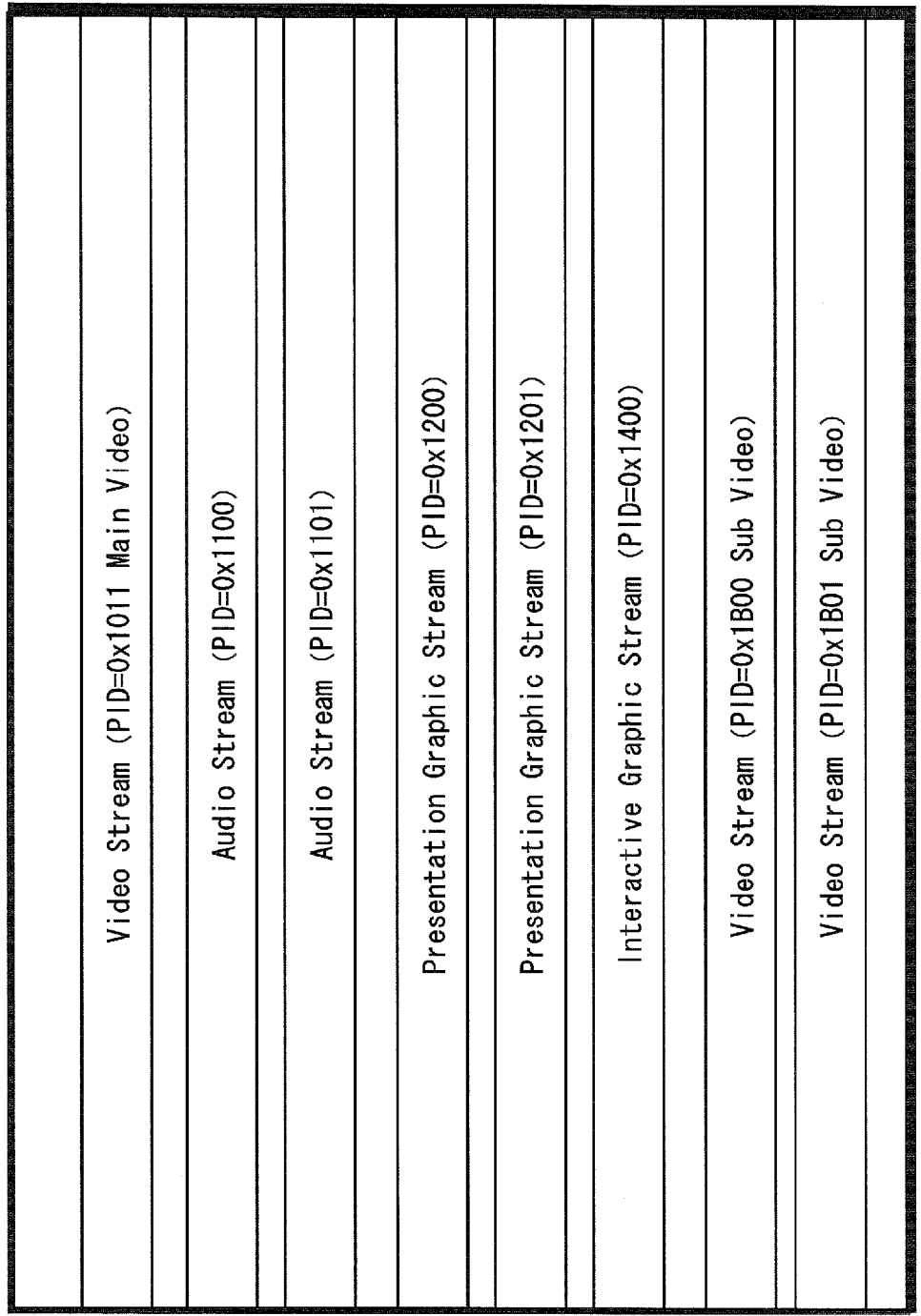
FIG. 11 is a schematic drawing illustrating the structure of multiplexed data.

FIG. 11 is a view illustrating an exemplary user packet structure. As illustrated in FIG. 11, a user packet is obtained by multiplexing one or more of elementary streams, which are elements constituting a broadcast program (program or an event which is part of a program) currently provided through respective services. Examples of elementary streams include a video stream, audio stream, presentation graphic (PG) stream, and interactive graphic (IG) stream. In the case where a broadcast program carried by user packet(s) is a movie, the video streams represent main video and sub video of the movie, the audio streams represent main audio of the movie and sub audio to be mixed with the main audio, and the PG stream represents subtitles of the movie. The term "main video" used herein refers to video images normally presented on a screen, whereas "sub video" refers to video images (for example, images of text explaining the outline of the movie) to be presented in a small window inserted within the video images. The IG stream represents an interactive display constituted by presenting GUI components on a screen.

Each stream contained in a user packet is identified by an identifier called PID uniquely assigned to the stream. For example, the video stream carrying main video images of a movie is assigned with "0x1011", each audio stream is assigned with a different one of "0x100" to "0x111F", each PG stream is assigned with a different one of "0x1200" to "0x121F", each PG stream is assigned with a different one of "0x1400" to "0x141F", each video stream carrying sub video images of the movie is assigned with a different one of "0x1B00" to "0x1B1F", each audio stream of sub-audio to be mixed with the main audio is assigned with a different one of "0x1A00" to "0x1A1F".

Figure 12:
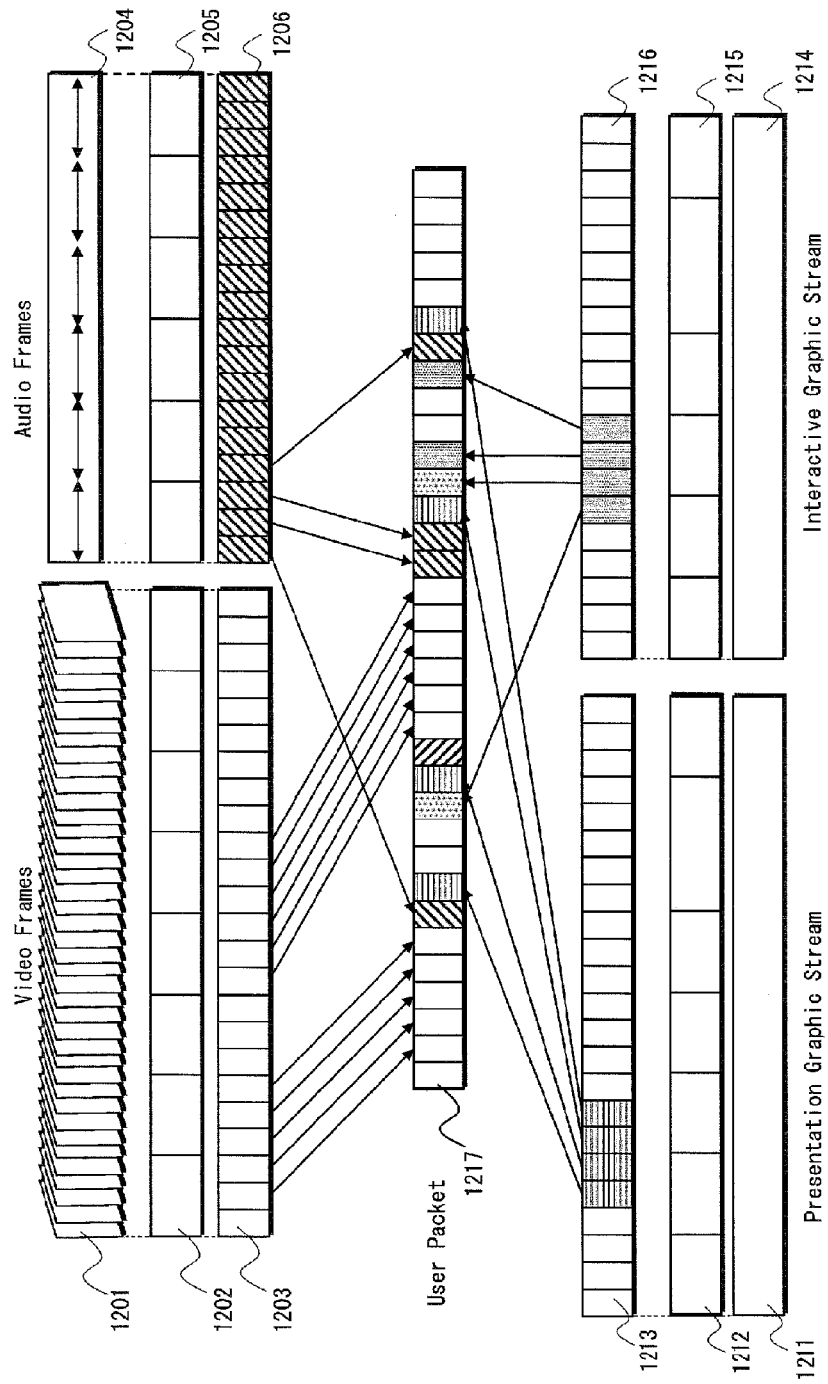
FIG. 12 is a schematic drawing illustrating how each stream is multiplexed.

FIG. 12 is a schematic view illustrating an example of how the respective streams are multiplexed into a user packet. First, a video stream 1201 composed of a plurality of video frames is converted into a PES packet sequence 1202 and then into a TS packet sequence 1203, whereas an audio stream 1204 composed of a plurality of audio frames is converted into a PES packet sequence 1205 and then into a TS packet sequence 1206. Similarly, the PG stream 1211 is first converted into a PES packet sequence 1212 and then into a TS packet sequence 1213, whereas the IG stream 1216 is converted into a PES packet sequence 1212 and then into a TS packet sequence 1216. The user packets 1217 are obtained by multiplexing the TS packet sequences (1203, 1206, 1213 and 1216) into one stream.

Figure 13:
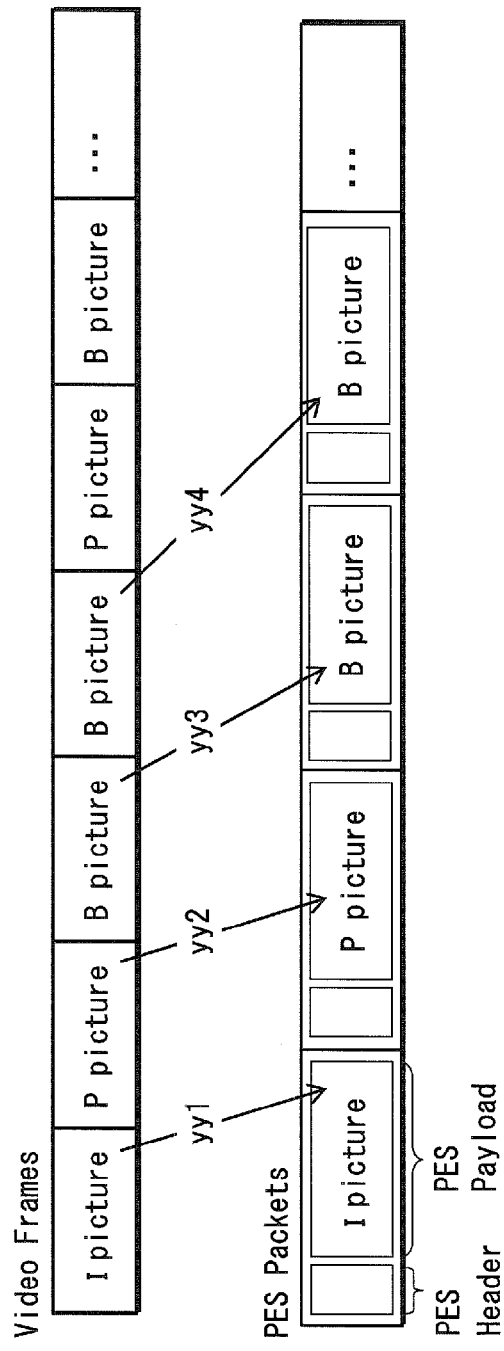
FIG. 13 is a schematic drawing illustrating in detail how a video stream is stored in a sequence of PES packets.

FIG. 13 illustrates the details of how a video stream is divided into a sequence of PES packets. In FIG. 13, the first tier shows a sequence of video frames included in a video stream. The second tier shows a sequence of PES packets. As indicated by arrows yy1, yy2, yy3, and yy4 shown in FIG. 13, a plurality of video presentation units, namely I pictures, B pictures, and P pictures, of a video stream are separately stored into the payloads of PES packets on a picture-by-picture basis. Each PES packet has a PES header and the PES header stores a Presentation Time-Stamp (PTS) and Decoding Time-Stamp (DTS) indicating the display time and decoding time of a corresponding picture.

Figure 14:
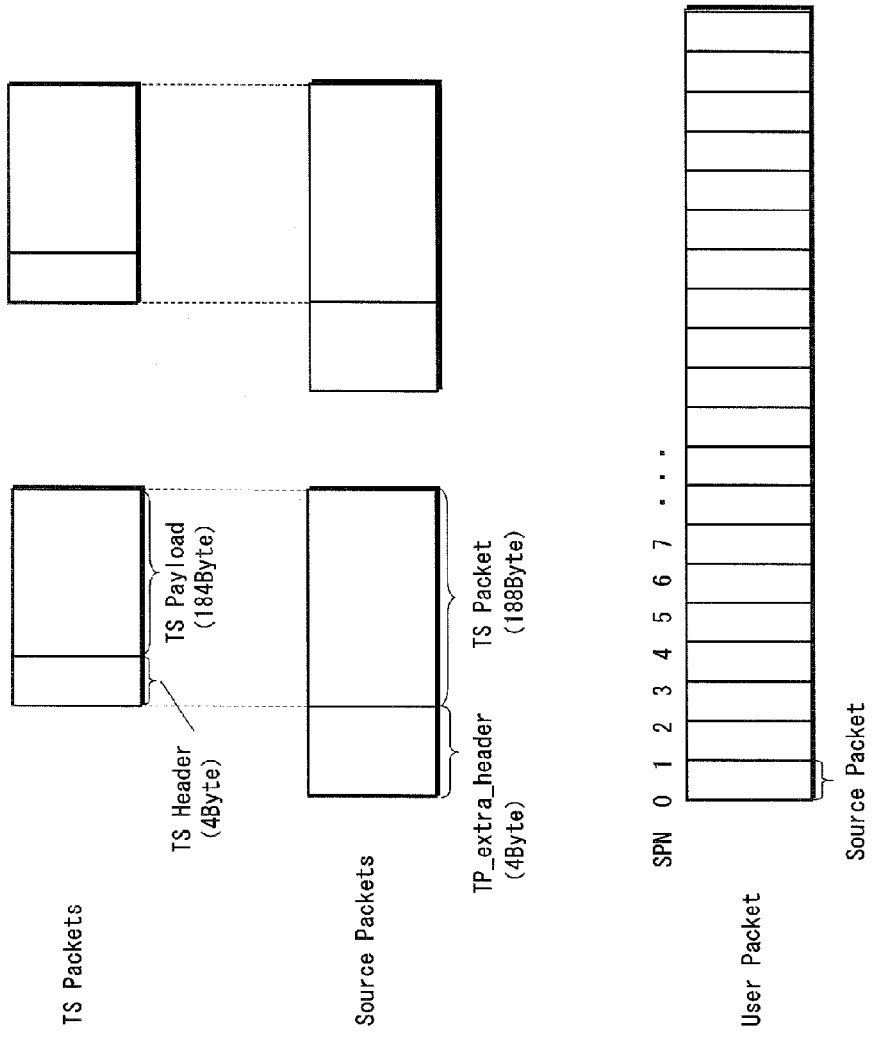
FIG. 14 is a schematic drawing illustrating the format of a TS packet and a source packet present in multiplexed data.

FIG. 14 illustrates the format of a TS packet to be eventually loaded to a user packet. The TS packet is a fixed length packet of 188 bytes and has a 4-byte TS header containing such information as PID identifying the stream and a 184-byte TS payload carrying actual data. The PES packets described above are divided to be stored into the TS payloads of TS packets. In the case of BD-ROM, each TS packet is attached with a TP extra header of 4 bytes to build a 192-byte source packet, which is to be loaded to a user packet. The TP extra header contains such information as arrival time stamp (ATS). The ATS indicates a time for starring transfer of the TS packet to the PID filter of a decoder. As shown on the lowest tier in FIG. 14, a user packet includes a sequence of source packets each bearing a source packet number (SPN), which is a number incrementing sequentially from the start of the user packet.

In addition to the TS packets storing streams such as video, audio, and PG streams, a user packet also includes TS packets storing a Program Association Table (PAT), a Program Map Table (PMT), and a Program Clock Reference (PCR). The PAT in a user packet indicates the PID of a PMT used in the user packet, and the PID of the PAT is "0". The PMT includes PIDs identifying the respective streams, such as video, audio and subtitles, contained in a user packet and attribute information (frame rate, aspect ratio, and so on) of the streams identified by the respective PIDs. In addition, the PMT includes various types of descriptors relating to the user packet. One of such descriptors may be copy control information indicating whether or not copying of the user packet is permitted. The PCR includes information for synchronizing the Arrival Time Clock (ATC), which is the time axis of ATS, with the System Time Clock (STC), which is the time axis of PTS and DTS. More specifically, the PCR packet includes information indicating an STC time corresponding to the ATS at which the PCR packet is to be transferred.

Figure 15:
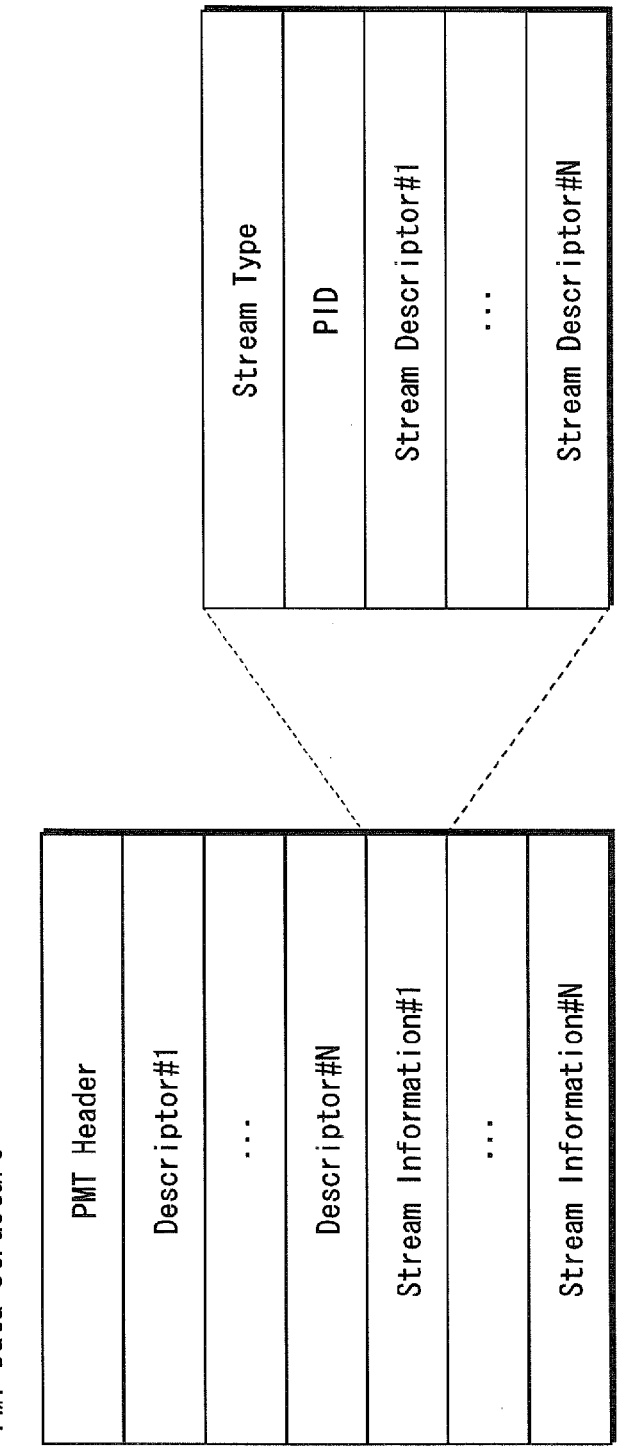
FIG. 15 is a schematic drawing illustrating the structure of PMT data.

FIG. 15 is a view illustrating the data structure of PMT in detail. The PMT starts with a PMT header indicating the length of data contained in the PMT. Following the PMT header, descriptors relating to the user packet are disposed. One example of a descriptor included in the PMT is copy control information described above. Following the descriptors, pieces of stream information relating to the respective streams included in the user packet are arranged. Each piece of stream information is composed of stream descriptors indicating a stream type identifying a compression codec employed for a corresponding stream, a PID of the stream, and attribute information (frame rate, aspect ratio, and the like) of the stream. The PMT includes as many stream descriptors as the number of streams included in the user packet.

When recorded onto a recoding medium, for example, the user packet is recorded along with a user packet information file.

Figure 16:
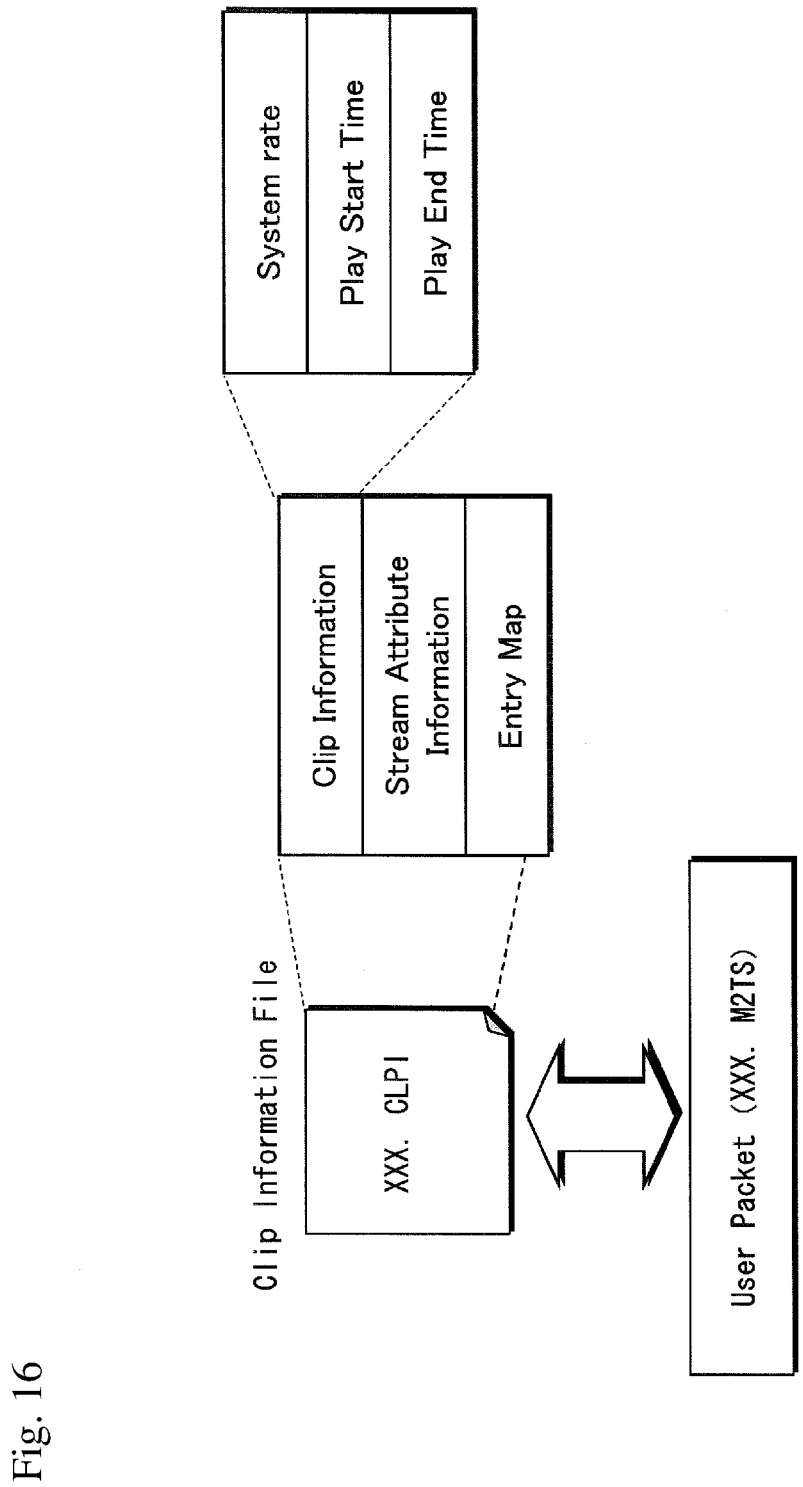
FIG. 16 is a schematic drawing illustrating the internal structure of multiplexed data.

FIG. 16 is a view illustrating the structure of the user packet information file. As illustrated in FIG. 16, the user packet information file is management information of a corresponding user packet and composed of user packet information, stream attribute information and an entry map. Note that user packet information files and user packets are in a one-to-one relationship.

As illustrated in FIG. 16, the user packet information is composed of a system rate, playback start time, and playback end time. The system rate indicates the maximum transfer rate of the user packet to the PID filter of a system target decoder, which will be described later. The user packet includes ATSs at intervals set so as not to exceed the system rate. The playback start time is set to the time specified by the PTS of the first video frame in the user packet, whereas the playback end time is set to the time calculated by adding the playback period of one frame to the PTS of the last video frame in the user packet.

Figure 17:
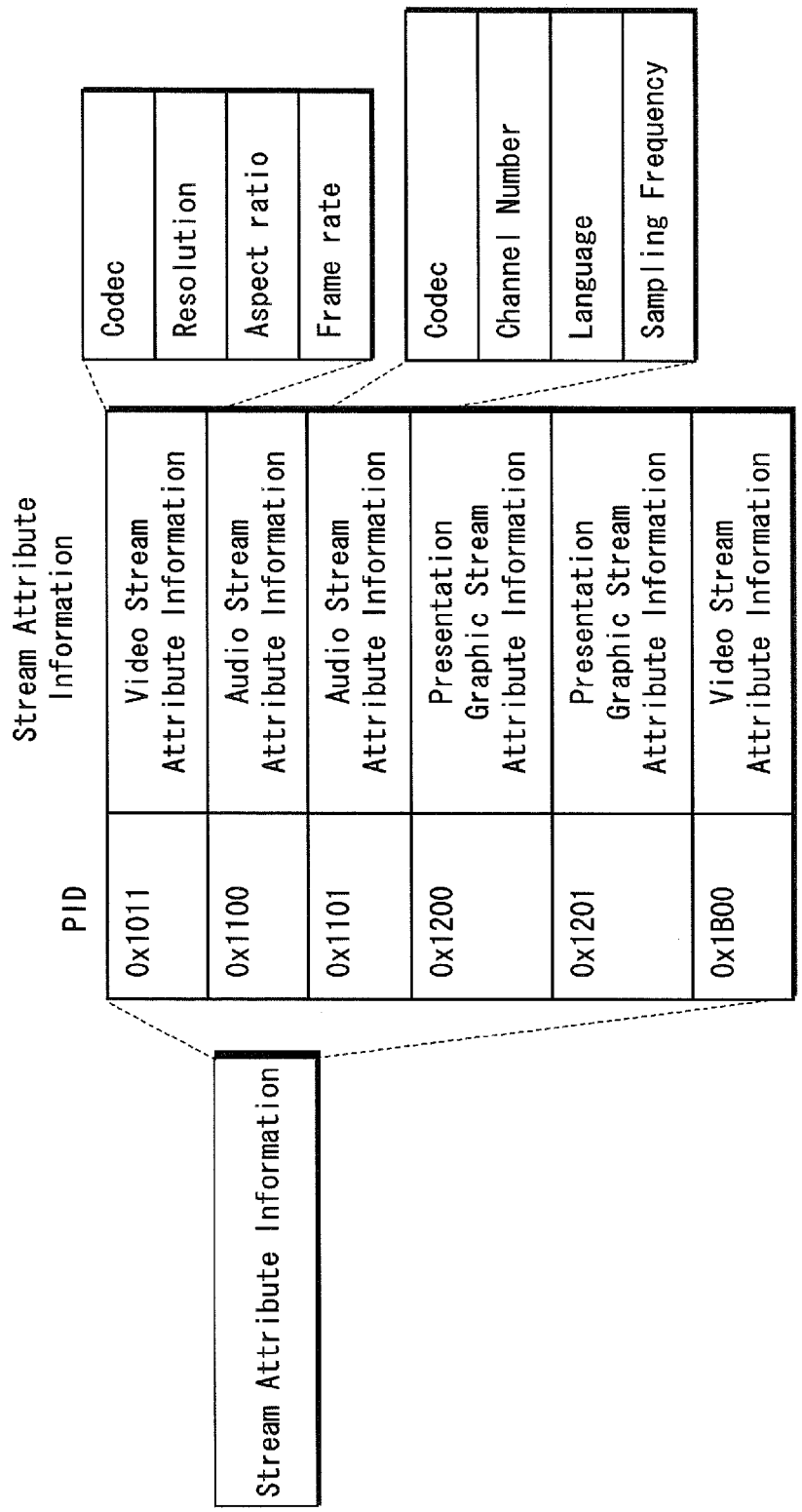
FIG. 17 is a schematic drawing illustrating the internal structure of stream attribute information.

FIG. 17 illustrates the structure of stream attribute information contained in a user packet information file. As illustrated in FIG. 17, the stream attribute information includes pieces of attribute information of the respective streams included in a user packet and each attribute information is registered with a corresponding PID. That is, different pieces of attribute information are provided for different streams, namely a video stream, an audio stream, a PG stream and an IG stream. The video stream attribute information indicates the compression codec employed to compress the video stream, the resolutions of individual pictures constituting the video stream, the aspect ratio, the frame rate, and so on. The audio stream attribute information indicates the compression codec employed to compress the audio stream, the number of channels included in the audio stream, the language of the audio stream, the sampling frequency, and so on. These pieces of information are used to initialize a decoder before playback by a player.

In the present embodiment, from among the pieces of information included in the user packet information file, the stream type included in the PMT is used. In the case where the user packet is recorded on a recording medium, the video stream attribute information included in the user packet information file is used. More specifically, the moving picture coding method and device described in any of the above embodiments may be modified to additionally include a step or unit of setting a specific piece of information in the stream type included in the PMT or in the video stream attribute information. The specific piece of information is for indicating that the video data is generated by the moving picture coding method and device described in the embodiment. With the above structure, video data generated by the moving picture coding method and device described in any of the above embodiments is distinguishable from video data compliant with other standards.

Figure 18:
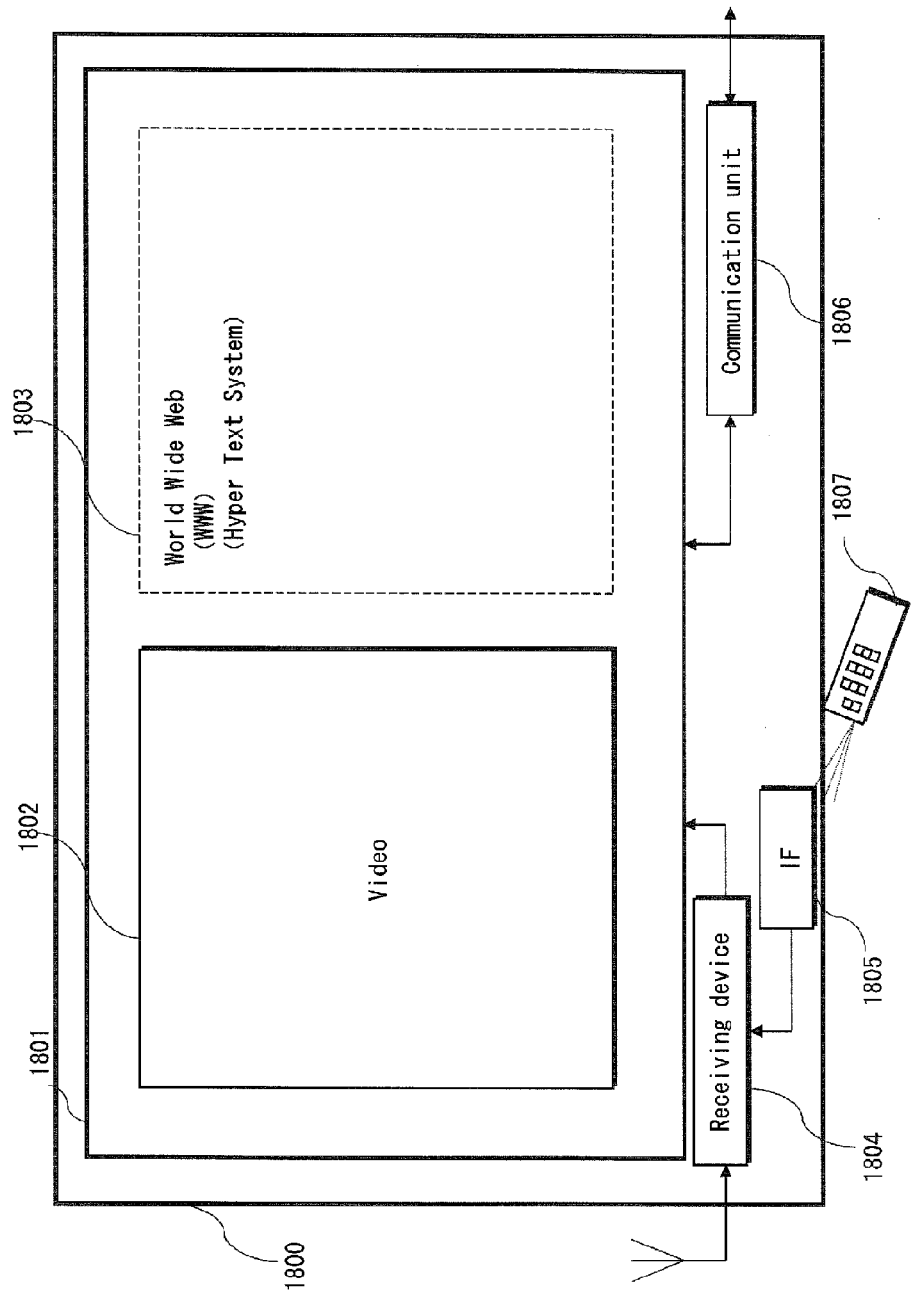
FIG. 18 is a schematic drawing illustrating an example of the structure of video display and audio output device.

FIG. 18 illustrates an exemplary structure of a video and audio output device 1800 that includes a receiving device 1804 for receiving a modulated signal carrying video and audio data or data for data broadcasting from a broadcasting station (base station). Note that the structure of the receiving device 1804 is basically same as the receiving device 1000 illustrated in FIG. 10. The video and audio output device 1800 is installed with an Operating System (OS), for example, and also with a communication unit 1806 (a device for wireless Local Area Network (LAN) or Ethernet (registered trademark), for example) for establishing Internet connection. With this structure, hypertext (World Wide Web (WWW)) 1803 provided over the Internet can be displayed on a display area 1801 simultaneously with images 1802 reproduced on the display area 1801 from the video and audio data or data provided by data broadcasting. By operating a remote control (which may be a mobile phone or keyboard) 1807, the user can make a selection on the images 1802 reproduced from data provided by data broadcasting or the hypertext 1803 provided over the Internet to change the operation of the video and audio output device 1800. For example, by operating the remote control to make a selection on the hypertext 1803 provided over the Internet, the user can change the WWW site currently displayed to another site. Alternatively, by operating the remote control 1807 to make a selection on the images 1802 reproduced from the video or audio data or data provided by the data broadcasting, the user can transmit information indicating the selected channel (such as selected broadcast program or audio broadcasting). In response, an interface (IF) 1805 acquires information transmitted from the remote control 1807, so that the receiving device 1804 operates to obtain reception data by demodulation and error correction of a signal carried on the selected channel. At the time of data reception, the receiving device 1804 receives control symbols containing information indicating a transmission method of a signal carried on the selected channel, so that the information indicative of the transmission method is obtained. With the information, the receiving device 1804 is enabled to make appropriate settings for the receiving operation, demodulation method, and error correction method to duly receive user packets transmitted from a broadcast station (base station). Although the above description is directed to an example in which the user selects a channel using the remote control 1807, the same description applies to an example in which the user selects a channel using a selection key provided on the video and audio output device 1800.

In addition, the video and audio output device 1800 may be operated via the Internet. (The video and audio output device 1800 therefore has the recording unit 1008 as illustrated in FIG. 10.) Before starting the pre-programmed recording, the video and audio output device 1800 selects the channel, so that the receiving device 1804 operates to obtain reception data by demodulation and error correction of a signal carried on the selected channel. At the time of data reception, the receiving device 1804 receives control symbols containing information indicating a transmission method of a signal carried on the selected channel, so that the information indicative of the transmission method is obtained. With the information, the receiving device 1804 is enabled to make appropriate settings for the receiving operation, demodulation method, and error correction method to duly receive user packets transmitted from a broadcast station (base station).

Summarizing, the present invention relates to transmission and reception of digital broadcast in a digital broadcast network supporting a configuration of a single or multiple physical layer pipes. In particular, according to the present invention, signalling parameters relating to PLP are transmitted within layer 1 signalling related to the PLP. The baseband frames mapped on the PLP are configured according to this layer 1 signalling in the same way at the transmitter and the receiver. The baseband frames are transmitted and received without including these parameters, in particular, at least one of parameters indicating (i) an input stream format, (ii) a single or a multiple input stream, (iii) constant or adaptive coding and modulation, (iv) presence of input stream synchronization, (v) presence of null packet deletion, or (vi) input stream identifier.

INDUSTRIAL APPLICABILITY

The present invention is useful in particular in a digital broadcasting system capable of data transmission using multiple PLPs.

REFERENCE SIGNS LIST 800 digital broadcast system
810 transmitting apparatus
815 transmitting station
820 personal computer (PC)
830 set top box (STB)
840 digital or analog TV
850 digital TV with integrated broadcast receiver
900a transmitter
900b receiver
910 PLP set-up unit
920 signalling transmitting unit
940 multiplexer
950 data mapping unit
960 demultiplexer
970 PLP signalling receiving unit
980 PLP signalling determining unit
990 data demapping unit
1000 receiving device
1001 tuner
1002 demodulation unit
1003 stream input/output unit
1004 signal processing unit
1005 audio and visual (AV) output unit
1006 audio output unit
1007 video display unit
1008 recording unit
1009 stream output interface (interface) IF
1010 operation input unit
1011 audio and visual interface (AV output IF)
1030, 1040 medium
1050 remote control
1800 video and audio output device
1801 display area
1802 images
1803 hypertext
1804 receiving device
1805 interface (IF)
1806 communication unit
1807 remote control

The invention claimed is:
1. A method for transmitting, in a digital broadcast network supporting a configuration of a plurality of physical layer pipes, digital broadcast data encapsulated into one or more baseband frames each with a header of a predefined format, the baseband frames being the frames to which physical layer forward error correction coding is applied and that are mapped on at least one physical layer pipe, the method comprising the steps of:

configuring one or more parameters of a physical layer pipe;

transmitting the configured parameters within physical layer signaling related to said physical layer pipe; and transmitting, within said physical layer pipe baseband frames, the header of each baseband frame including a parameter indicating presence of input stream synchronization and parameters indicating at least one of a length of a baseband payload and a distance to a start of a first user packet within the baseband frame, and not including a parameter indicating an input stream identifier and parameters indicating at least two of an input stream format, a single or a multiple input stream, constant or adaptive coding and modulation, and presence of null packet deletion, wherein the physical layer signaling at least includes the parameters that are not included in the header of each baseband frame indicating said at least two of an input stream format, a single or a multiple input stream, constant or adaptive coding and modulation, and presence of null packet deletion.

2. A method for receiving, in a digital broadcast network supporting a configuration of a plurality of physical layer pipes, digital broadcast data encapsulated into one or more baseband frames each with a header of a predefined format, the baseband frames being the frames to which physical layer forward error correction coding is applied and that are demapped from at least one physical layer pipe, the method comprising the steps of:

receiving one or more parameters describing the configuration of a physical layer pipe within physical layer signaling related to said physical layer pipe;

decoding the parameters describing the configuration of said physical layer pipe and applying the signaled configuration to each baseband frame received within said physical layer pipe; and receiving, within said physical layer pipe baseband frames, the header of each baseband frame including a parameter indicating presence of input stream synchronization and parameters indicating at least one of a length of a baseband payload and a distance to a start of a first user packet within the baseband frame, and not including a parameter indicating an input stream identifier and parameters indicating at least two of an input stream format, a single or a multiple input stream, constant or adaptive coding and modulation, and presence of null packet deletion, wherein the physical layer signaling at least includes the parameters that are not included in the header of each baseband frame indicating said at least two of an input stream format, a single or a multiple input stream, constant or adaptive coding and modulation, and presence of null packet deletion.

3. An apparatus for transmitting, in a digital broadcast network supporting a configuration of a plurality of physical layer pipes, digital broadcast data encapsulated into one or more baseband frames each with a header of a predefined format, the baseband frames being the frames to which physical layer forward error correction coding is applied and that are mapped on at least one physical layer pipe, the apparatus comprising:

a parameter setting unit for configuring one or more parameters of a physical layer pipe;

a signaling transmitting unit for transmitting the configured parameters within physical layer signaling related to said physical layer pipe; and a data transmitting unit for transmitting, within said physical layer pipe baseband frames, the header of each baseband frame including a parameter indicating presence of input stream synchronization and parameters indicating at least one of a length of a baseband payload and a distance to a start of a first user packet within the baseband frame, and not including a parameter indicating an input stream identifier and parameters indicating at least two of an input stream format, a single or a multiple input stream, constant or adaptive coding and modulation, and presence of null packet deletion, wherein the physical layer signaling at least includes the parameters that are not included in the header of each baseband frame indicating said at least two of an input stream format, a single or a multiple input stream, constant or adaptive coding and modulation, and presence of null packet deletion.

4. An apparatus for receiving, in a digital broadcast network supporting a configuration of a plurality of physical layer pipes, digital broadcast data encapsulated into one or more baseband frames each with a header of a predefined format, the baseband frames being the frames to which physical layer forward error correction coding is applied and that are demapped from at least one physical layer pipe, the apparatus comprising:

a signaling receiving unit for receiving one or more parameters describing the configuration of a physical layer pipe within physical layer signaling related to said physical layer pipe;

a PLP determining unit for decoding the parameters describing the configuration of said physical layer pipe and applying the signaled configuration to each baseband frame received within said physical layer pipe; and a data receiving unit for receiving, within said physical layer pipe baseband frames, the header of each baseband frame including a parameter indicating presence of input stream synchronization and parameters indicating at least one of a length of a baseband payload and a distance to a start of a first user packet within the baseband frame, and not including a parameter indicating an input stream identifier and parameters indicating at least two of an input stream format, a single or a multiple input stream, constant or adaptive coding and modulation, and presence of null packet deletion, wherein the physical layer signaling at least includes the parameters that are not included in the header of each baseband frame indicating said at least two of an input stream format, a single or a multiple input stream, constant or adaptive coding and modulation, and presence of null packet deletion.

\* \* \* \* \*